(12) United States Patent
Boselli et al.

(10) Patent No.: US 10,040,159 B2
(45) Date of Patent: Aug. 7, 2018

(54) EQUIPMENT AND GRINDING MACHINE FOR THE GRINDING OF EXTERNAL RINGS OF ROLLER BEARINGS

(71) Applicant: TENOVA S.P.A., Milan (IT)

(72) Inventors: Giovanni Boselli, Magenta-Milan (IT); Massimo Perassolo, Grondona-Alessandria (IT); Thomas Andresson, Vallentuna (SE)

(*) Notice: Subject to any disclaimer, the term of this patent is extended or adjusted under 35 U.S.C. 154(b) by 212 days.

(21) Appl. No.: 15/118,084

(22) PCT Filed: Mar. 9, 2015

(86) PCT No.: PCT/IB2015/000301
§ 371 (c)(1),
(2) Date: Aug. 10, 2016

(87) PCT Pub. No.: WO2015/136350
PCT Pub. Date: Sep. 17, 2015

(65) Prior Publication Data
US 2016/0368111 A1    Dec. 22, 2016

(30) Foreign Application Priority Data
Mar. 11, 2014   (IT) .............................. MI2014A0381

(51) Int. Cl.
*B24B 5/04* (2006.01)
*F16C 33/64* (2006.01)
(Continued)

(52) U.S. Cl.
CPC .................. *B24B 5/04* (2013.01); *B24B 5/35* (2013.01); *B24B 5/37* (2013.01); *B24B 41/061* (2013.01); *F16C 33/64* (2013.01)

(58) Field of Classification Search
CPC .... B24B 1/00; B24B 5/37; B24B 5/04; B24B 5/42; B24B 41/061; B23P 15/003; F16C 33/54
(Continued)

(56) References Cited

U.S. PATENT DOCUMENTS 4,109,420 A * 8/1978 Giaccherino ............. B24B 5/16
                                                   451/246
2015/0343597 A1* 12/2015 von Schleinitz ...... B24B 39/045
                                                   384/456

FOREIGN PATENT DOCUMENTS

| CN | 201405234 | 2/2010 |
|---|---|---|
| EP | 1514639 | 3/2005 |
| JP | S6119552 | 1/1986 |

* cited by examiner

*Primary Examiner* — Monica Carter
*Assistant Examiner* — Lauren Beronja
(74) *Attorney, Agent, or Firm* — Themis Law

(57) ABSTRACT

Equipment for grinding external rings of roller bearings includes a supporting pin of a bearing to be ground, a stop extending outwardly from the supporting pin for axial positioning of a side of the bearing, a sliding flange on the pin which can be positioned to rest on the other side of the bearing, a clamping nut which can be firmly positioned on a complementary portion of the pin, skids preloaded by springs situated on opposite sides of the bearing, and a guiding element on the opposite side of the stop, which receives a structure carrying a pair of contrast rolls movable to be engaged with the external ring of the bearing creating a radial force thereon, which can be predetermined and regulated by a maneuvering element to eliminate the clearance of the bearing in the radial direction. A machine for housing equipment of the above specified type.

10 Claims, 25 Drawing Sheets

(51) Int. Cl.
    *B24B 5/37*         (2006.01)
    *B24B 41/06*      (2012.01)
    *B24B 5/35*         (2006.01)

(58) Field of Classification Search
    USPC .................. 451/49, 243, 246, 407, 142, 131
    See application file for complete search history.

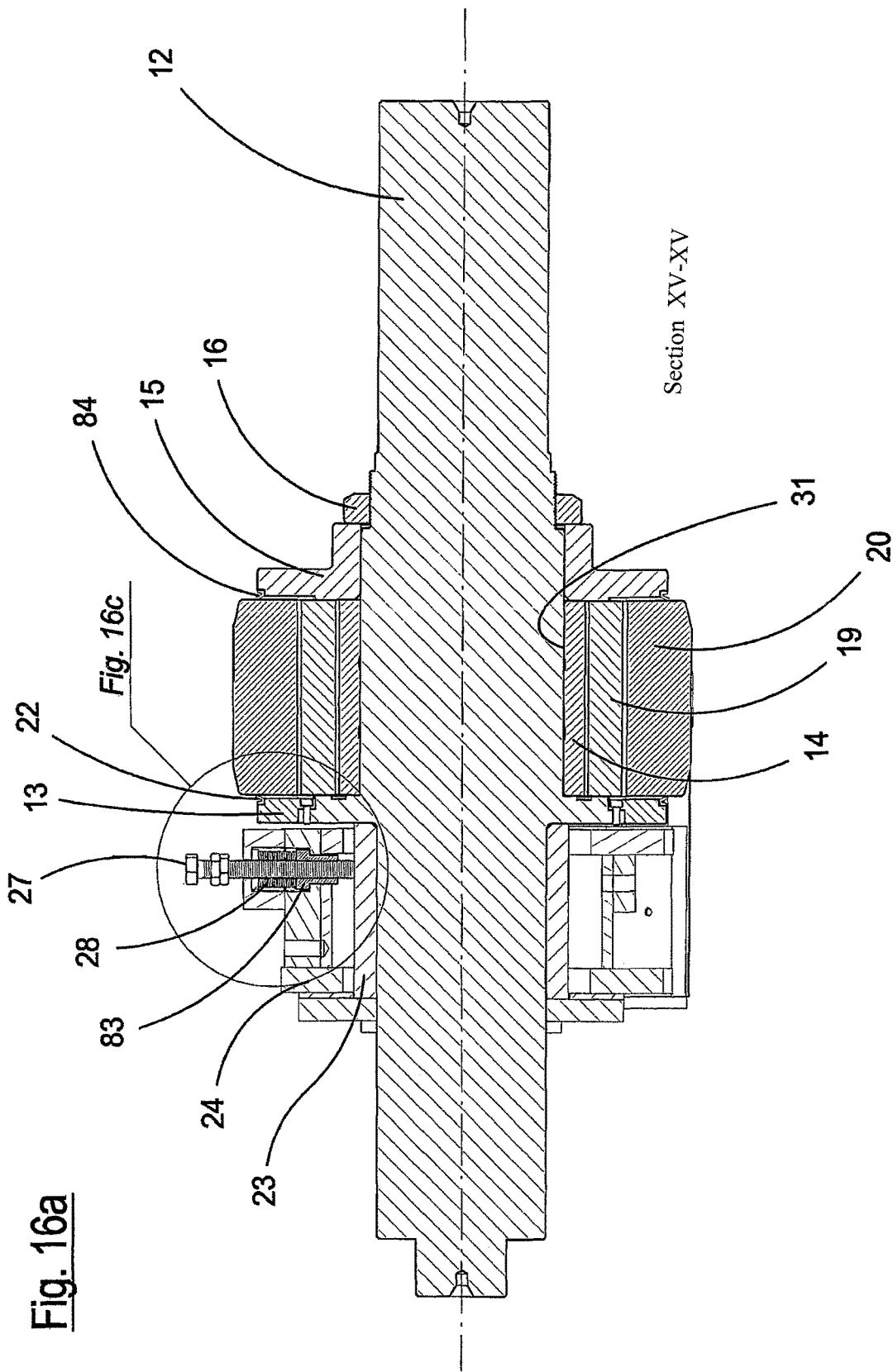

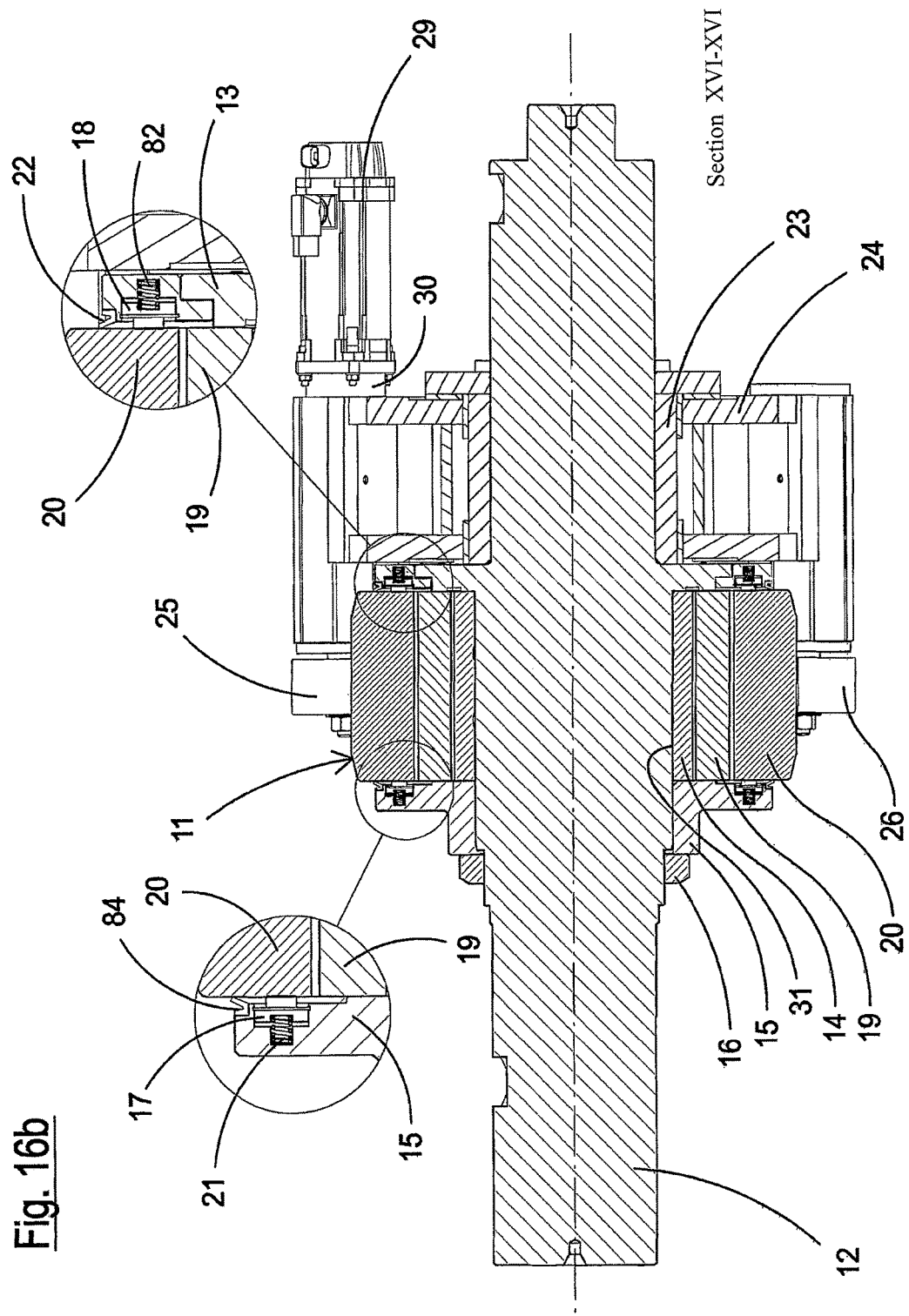

Section XVII-XVII

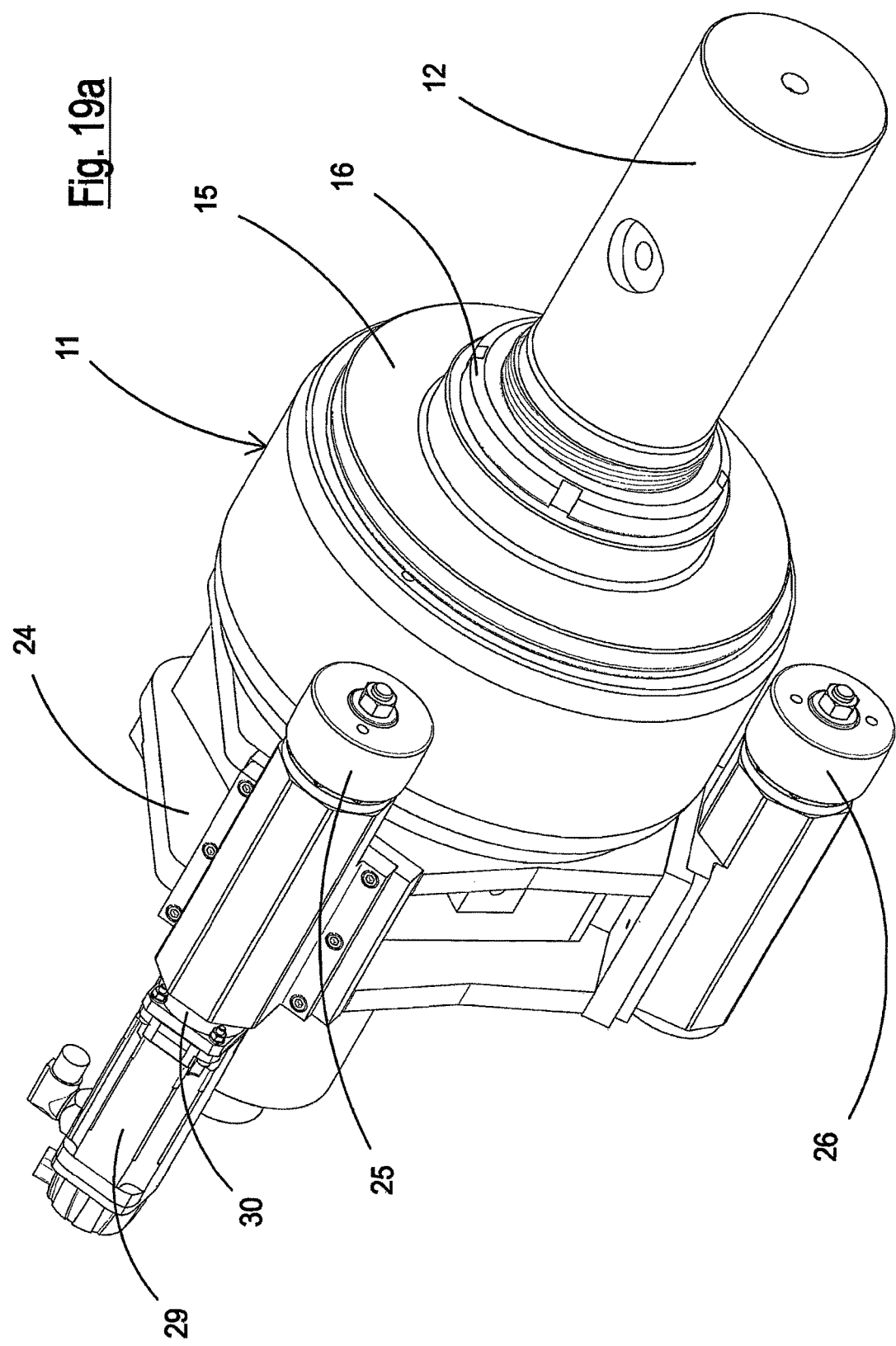

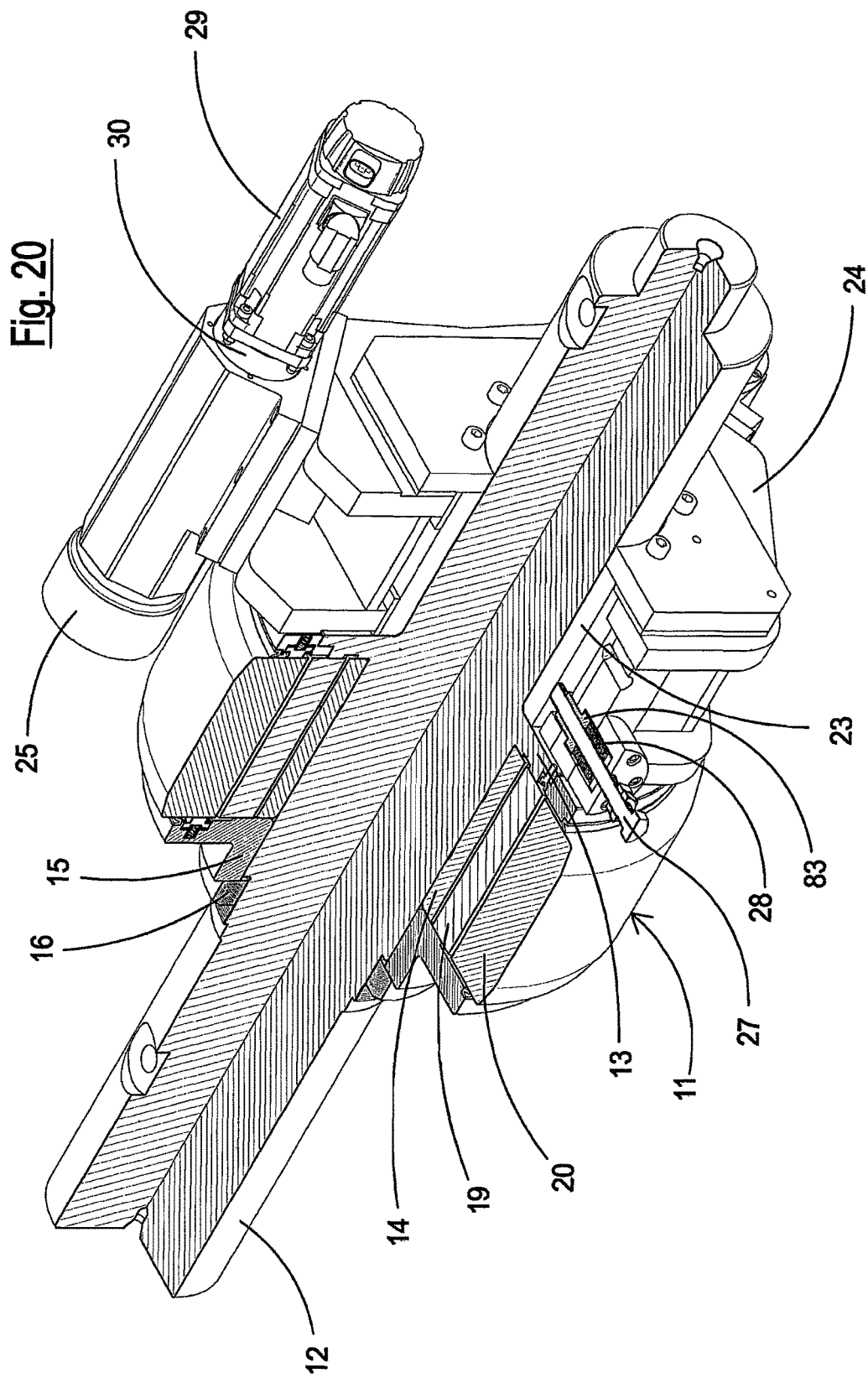

EQUIPMENT AND GRINDING MACHINE FOR THE GRINDING OF EXTERNAL RINGS OF ROLLER BEARINGS

The present invention relates to equipment for the grinding of external rings of roller bearings and a grinding machine.

As this procedure is widely used in the field of rolling mills for metals, reference will be made to it hereinafter for describing a typical field of use of the invention. An introduction is proposed hereunder, in which the fundamental elements of this technology are presented.

It should be remembered that the process through which metals are obtained in the form of sheets, strips and flat products in general, is called "lamination" (or "rolling").

Plants that effect lamination are called "rolling mills". There is a wide variety of types of rolling mill, depending on the production capacity it must have and the qualitative and geometrical characteristics of the product to be obtained. The main types of rolling mill are:

A first type is a rolling mill known as "duo" (2-High mill), as shown in FIG. 1. This rolling mill consists of a pair of rolls through which the material is forced to pass, causing a desired reduction in its thickness. The main limit of use of this plant lies in the diameter of the rolls. On the one hand, it is, in fact, useful for these rolls to have a relatively small diameter to make the lamination process as efficient as possible. It is known, in fact, that, with the same characteristics of the material to be rolled and with the same reduction in thickness, the smaller the diameter of the roll, the lesser the radial forces to which the roll is subjected during the process will be. It is also known, moreover, that, for the lamination of relatively small thicknesses, the use of rolls having a small diameter makes the process more efficient.

In order to limit its radial deformations within acceptable limits, on the other hand, the diameter must be relatively large. Furthermore, as the rigidity of the rolls inversely depends on the cube of its length, there is a limitation in the maximum width of the product that can be laminated.

These qualitative considerations explain why the fundamental parameters of a rolling mill are always the result of a compromise.

A second type is a rolling mill known as the "fourth" type (4-high mill), as shown in FIG. 2.

In this case, there are four rolls, in which those in contact with the laminate are called "work rolls" and those in contact with the work rolls are called "back-up rolls".

The purpose of the latter is to limit the radial deformations of the work rolls to be able to operate within a more convenient range of parameters with respect to the "duo" rolling mill, i.e. to reduce the diameter of the work rolls and increase their length, with the same reduction in thickness.

A third type of rolling mill is called the "sixth" type (6-high mill), as shown in FIG. 3.

In this case, there are six rolls. The rolls in contact with the laminate are called "work rolls", whereas those in contact with the work rolls are called "intermediate rolls". Finally, there are back-up rolls which are in contact with the intermediate rolls.

The objective of this solution is again to give the work roll as much rigidity as possible, at the same time limiting its diameter and increasing its length.

A common characteristic to all types of rolling mill previously mentioned is that the design aims at only keeping the radial forces perpendicular to the laminate, under control. The horizontal forces, on the contrary, which are always present in the lamination process are, in fact, completely borne by the work roll.

In order to overcome this drawback, a family of rolling mills has been created, which have a layout of rolls which also oppose the above-mentioned horizontal forces.

For this purpose, the rolling mill called "Z-High" has been constructed, as shown in FIG. 4.

This rolling mill is simply an evolution of the "sixth" type or "6-High", to which three rolls have been added (also called "side support rolls") at each side of the two work rolls.

This rolling mill represents a compromise between the three types previously described and rolling mills called "Multi High mills", of which the most common is that called "20 High", as shown in FIG. 5.

This rolling mill is so called as there are as many as twenty rolls composing it, classified as follows:
 two "Work" rolls (in contact with the laminate),
 four "First Intermediate" rolls (two for each work roll),
 six "Second Intermediate" rolls,
 eight "Back-up" rolls (back-up assemblies).

As can be seen from FIG. 5, the objective of this layout is to give the work rolls as much rigidity as possible in both a perpendicular direction and also in that parallel to the laminate, in order to optimize both the diameter and the length of the work roll as previously described.

It should also be pointed out that the basic difference between the various types of rolling mills presented above, apart from the layout of the rolls, consists in the design of the back-up rolls.

In the first four types of rolling mill (duo, fourth, sixth and Z-High), the back-up roll consists of a roll supported by bearings at its ends and, from a structural point of view, is represented as a beam resting at the ends. The back-up rolls rotate around their own axis, together with the work rolls and possible intermediate rolls.

In the case of "Multi-High" rolling mills, the design of the back-up rolls is very different and, in order to try and increase the flexural rigidity to the maximum, with the same dimensions, they have the configuration of FIG. 6. In this case, the back-up rolls are called "back-up assemblies".

In these applications, the cylinder is no longer a solid rotating on bearings, but consists of a shaft (called "pin") on which a certain number of roller bearings are assembled. Unlike the cases of FIGS. 1, 2, 3 and 4, the shaft does not rotate, as this function is exerted by the external ring of the bearing and, in addition to be supported at both ends, it also carries a support between one bearing and another, in order to maximize the flexural strength.

A further consideration relates to the bearings used in the "back-up assemblies".

There are very different kinds of bearings used for the construction of the "back-up assemblies", but the most common ones are radial with two or three roll crowns and are constructed by the most important and qualified bearing constructors in the world.

These bearings, regardless of their construction form, have three elements:
 an internal ring,
 rolling elements,
 an external ring.

The bearing is assembled on the pin so that the internal ring is integral with the pin itself (there is no relative motion between these two elements), whereas the external ring is in contact with the "second intermediate" roll and is pulled into rotation by it.

Due to the high pressures exchanged by the external ring of the bearing and the intermediate roll, the outer surface of the ring is subject to wear and the bearing must be periodically disassembled from the pin to undergo maintenance.

The essential phase of the maintenance of the bearing consists in the grinding of the outer surface of the external ring in order to restore its essential characteristics, such as the shape and roughness.

The external rings are constructed so as to allow various maintenance cycles.

To have a clearer understanding of which parameter should be kept under control during the grinding of the external ring, it is interesting to observe how the bearing behaves inside the rolling mill.

FIG. 7 shows the functioning scheme of the bearing assembled on the "back-up assembly". As can be seen in FIG. 7, the bearing and "second intermediate" roll exchange forces, whose direction passes through the centre of the roll and that of the bearing, respectively. In particular, the force that the "second intermediate" roll discharges on the bearing, pushes the external ring against the rolling bodies which, in turn, press against the internal ring. The internal ring, in turn, discharges its force on the pin which finally discharges these forces onto the frame of the rolling mill (mill housing) by means of the end and intermediate supports.

Due to the very nature of the bearing, in order to enable the rolling of the rolling elements, it is essential for there to be a radial clearance, even if small, between each rolling element and the external and internal rings. Now, as the passage of the forces between the various elements involves physical contact, this clearance must be zeroed in the region of the bearing where the forces are exchanged. The whole of said clearance must consequently be in the opposite region. If the radial clearance of the bearing is defined with p, this gives:

$$GAP=2*p$$

It has already been explained that, from a functional point of view, the objective of the "back-up assembly" is to harden the whole of the mill, by exerting a pressure on its "second intermediates". As lamination is a dynamic process, however, it must be ensured that the "back-up assembly" contributes to the stability of the lamination process.

In this respect, in order to ensure a good lamination process, it must be free of, or substantially free of vibrations. These vibrations can be self-excited (chatter) or generated by periodic forcing. One of the causes of forced vibrations inside a rolling mill is the geometry of the bearings assembled on the "back-up assemblies".

In the geometry of the "back-up assembly", schematized in FIG. 8, imagining that the axis of the pin is stationary (and this is reasonable as, except for inevitable elastic deformations, the pin discharges the forces onto the housing of the rolling mill), the distance between the contact point P between the bearing and the "second intermediate" roll and the centre of the pin, is equal to S.

Now, imagining S as a variable in relation to the rotation angle of the external ring of the bearing α, the following can be applied:

$$S=f(\alpha)$$

Supposing, in a first approximation, that the housing onto which the "back-up assembly" discharges the forces, is infinitely rigid, the variation in the dimension S with a variation in the angular position of the external ring of the bearing, will impose a radial deformation of the "second intermediate" which, in turn, will propagate as far as the laminate, causing a variation in the thickness of the same. More generally, a bad functioning of the system has been caused, which is revealed in the form of a bad quality of the laminate and vibrations in the lamination plant which, in the worst of cases, can cause damage to both the mechanical and electrical parts.

It is therefore intuitive to assert that, in order to ensure that the "back-up assembly" does not introduce undesired dynamic effects in the lamination process, the quantity S should be either constant or, at the most, that the variations should be as limited as possible. In other words, the wider the oscillation of the parameter S, the lower the quality of the laminate and lamination plant in general will be.

The measurement method of the bearing after grinding, as can be seen in FIGS. 9*a* and 9*b*, is effected by means of an implement such as that illustrated therein.

The method consists in revealing the variation in the quantity S in a complete turn of the external ring and verifying that this variation is lower than or equal to a quantity considered as being acceptable. The method envisages that the bearing be assembled on a pin with a horizontal axis, so that the weight of the external ring annuls the clearance between the external and internal rings and the rolling elements in the upper part. The measurement is effected by placing a comparator on the vertical and causing the external ring to effect a complete revolution. The measurement consists in registering the oscillation of the comparator which, as already indicated, must be less than a prefixed quantity. In practice, from a geometrical point of view, it is as if the comparator had been placed in the point P (shown in FIG. 8) during the lamination process.

Again observing FIG. 8, it can be said that the quantity S is the sum of four contributions schematized in the formula:

$$S=R+Si+d+Se$$

wherein R is the radius of the pin, Si is the thickness of the internal ring, d is the diameter of the rolling elements and Se is the thickness of the external ring.

Analyzing each quantity in detail, it can be asserted that R is a constant. As the pin does not rotate, in fact, whatever its effective form may be (the pin has a cylindrical form, but its dimensions are subject to the rules of industrial tolerances), once it has been assembled in the rolling mill, the quantity R no longer varies.

As far as Si is concerned, the same applies as for the pin, as the internal ring is assembled on the pin and is integral with it, even if the thickness of the internal ring Si were not constant, once the ring has been assembled on the pin, the quantity Si no longer varies and, for the purposes of our reasoning, it can be considered another constant.

Ultimately, it can be asserted that:

$$S=f(d;Se)$$

and consequently the objective of the grinding is to restore the surface characteristics of the external ring by minimizing, at the same time, the variation in the function S which is nothing other than the oscillation registered by the comparator of FIGS. 9*a* and 9*b*. The lesser the oscillation of the function S, the better the performances of the rolling mill will be.

In this respect, in the known state of the art, there are numerous procedures for effecting the grinding of the external ring of the bearings. All of these known methods have in common the use of equipment which allows the assembly of the bearing on a normal grinding machine for rolls of rolling mills.

This equipment generally consists of a pin on which the bearing to be ground is totally or partly assembled and a device for the temporary elimination of the radial clearance of the bearing. Furthermore, a supporting and centering system is envisaged, such as centres of the grinding machine or suitable lunettes and, finally, a system for transmitting the rotational motion to the external ring or to the whole bearing.

A brief description is provided hereunder of the main items of equipment which are currently available on the market with an explanation of their functioning principle.

In a first application (FIG. 10), the assembly of the complete bearing is effected with the external ring free. In this application the bearing is assembled on a pin and the coupling take place by means of the hole of the internal ring of the same bearing.

The radial clearance of the bearing is eliminated by increasing the diameter of the pin thanks to a series of spaces formed in the pin itself, into which pressurized oil is sent. The pressure of the oil makes the body of the pin expand, increasing its diameter. This force is such as to also expand the internal ring of the bearing which expands until it eliminates the radial clearance of the bearing p in all directions (as shown in FIGS. 11 and 12 which illustrate the scheme of the assembly and elimination of the clearance). The expansion force is modulated so as to allow the rotation of the external ring, a condition which is indispensable for the grinding process.

At this point, the system is assembled between the centres of the grinding machine and the external ring is rotated using entrainment holes situated on the flat surface of the external ring, or flanges which transmit the torque by friction. It should be noted that the pin and internal ring do not rotate during the grinding. Finally, it should be pointed out that the pin must be provided with a suitable device which prevents its rotation once it has been assembled in the machine.

Patents EP 1514639 and EP 2060361, for example, implement this scheme.

The main limitations of the present application are the following:

A— Even supposing that, during construction, the pin has been processed so as to obtain a perfect cylindrical form of the same, said form will certainly vary during the expansion necessary for effecting the temporary fitting of the bearing. This causes a variability in the parameter R of FIG. 8 between the grinding phase and the lamination phase.

B— The radial clearance of the bearing is eliminated by radially expanding the whole internal ring and, due to the way in which the expansion takes place, it is difficult, also in this case, to keep the circularity of the internal rolling track under control. This ring may vary in form during the expansion, causing a variability in the parameter Si between the grinding phase and the lamination phase.

C— As the entrainment of the external ring takes place by means of the "piece-holder head" of the grinding machine, the pin can be supported between fixed points, provided the drive disc of the grinding machine and the tip are decoupled from each other. Otherwise, if the tip and the drive disc rotate integrally, a rotating tip must be used, which will introduce a further error into the system, due to the oscillation of the bearings assembled on it. It is obviously possible to use the fixed tip even if the drive disc and tip are integral with each other, but, in this case, there will be limitations in the maximum rotation rate that can be obtained, due to the danger of overheating between the tip (which, as it is integral with the drive disc, rotates) and the centre formed on the pin (which is fixed). Finally, the inevitable oscillation error of the pin must be taken into account, as there is a relative rotational movement between the pin and the tip supporting it.

D— The entrainment of the external ring generally takes place using the "piece-holder head" of the grinding machine and this method, due to its very nature, discharges unbalanced radial forces onto the external ring which cause a further error in the process.

An alternative to the first application referring to the scheme previously described as assembly of the complete bearing with the external ring free to rotate, consists in further increasing the expansion force until the movement between the various parts of the bearing is made impossible. In this case, the grinding is effected by rotating the unit created by the pin and the bearing which are in fact integral with each other.

With respect to the previous solution, this solution has the advantage that the entrainment is simpler, as it is sufficient to support the pin between the centres and cause the same to rotate using a suitable drive disc. This application, on the other hand, has various disadvantages:

A— Even supposing that, during construction, the pin has been processed so as to obtain a perfect cylindrical form of the same, said form will certainly vary during the expansion necessary for effecting the temporary fitting of the bearing. This causes a variability in the parameter R of FIG. 8 between the grinding phase and the lamination phase. Furthermore, as the pin rotates during the grinding and as the geometrical axis and the rotation axis can never perfectly coincide, a further oscillation of the parameter R will be caused in the process.

B— The radial clearance of the bearing is eliminated by radially expanding the whole internal ring. Due to the way in which the expansion takes place, it is difficult, also in this case, to keep the circularity of the internal rolling track under control, which may vary in form during the expansion, causing a variability in the parameter Si between the grinding phase and the lamination phase.

C— The blockage of the external ring is effected by means of the rolling elements and consequently the radial blocking forces are discharged onto the external ring at discrete points. This causes a variation in the form of the external ring which, during the grinding, is processed in a loading and deformation situation which is completely different from that which takes place when the bearing is assembled in the rolling mill. This can lead to a variation in the quantity d+Se between the working phase in the rolling mill and in the grinding phase.

D— In conclusion, from an analysis of points A, B and C, it is evident that all the variables that contribute to determining the distance between the contact point P and the centre of the pin, vary between the lamination phase and the grinding phase. This makes it extremely problematic to keep the oscillation of the quantity S within the desired limits.

E— If the pin is assembled on a grinding machine whose tip is decoupled with respect to the drive disc, it will be necessary to use rotating tips for supporting it, whose oscillation must be added to the errors described above for determining the total oscillation error. A fixed tip can obviously be used even if the drive disc and tip are decoupled with respect to each other but, in this case, there will be limitations in the maximum rotation rate that can be obtained due to the danger of overheating between the tip (which, as it is integral with the "piece-holder head", does not rotate) and the centre formed on the pin (which rotates). Finally, the inevitable oscillation error of the pin must be taken into account, as there is a relative rotational movement between the pin and the tip supporting it.

F— The entrainment of the pin can only take place using the "piece-holder head" of the grinding machine and this method, due to its very nature, discharges unbalanced radial forces onto the pin itself, which cause a further error in the process.

In general, when the bearing is to be ground with this type of configuration, mechanical fitting systems are never used, as the forces involved are relatively extremely large and therefore difficult to obtain with this method.

A further known alternative is the assembly of the bearing without the internal ring.

In this application, exemplified in FIG. 13, the bearing is assembled on a pin without its internal ring.

This solution is very similar to that described for the assembly of the complete bearing with the external ring blocked. In particular, the bearing, during grinding, is caused to rotate integrally with the pin with the difference that, as there is no internal ring of the bearing, the expansion forces are discharged directly from the pin to the rolling elements.

With respect to the two previous solutions, this solution offers the advantage that, as there is no internal ring, the radial forces necessary for annulling the clearance p are much more limited. This allows, as an alternative to hydraulic expanders, the use of mechanical expanders, as illustrated for example in FIG. 13, where the radial preloading is obtained by activating a ferrule which is engaged in a threading situated on the shaft; the ferrule, when screwed, moves in the direction of the shoulder formed on the pin itself, compressing, in an axial direction, suitable elastic elements which are compelled to expand radially, generating the desired preloading. This solution, on the other hand, has the following limitations which are substantially the same as those indicated for the case discussed above (with a blocked external ring):

A— Even supposing that, during construction, the pin has been processed so as to obtain a perfect cylindrical form of the same, said form will certainly vary during the expansion necessary for effecting the temporary fitting of the bearing. This causes a variability in the parameter R of FIG. 8 between the grinding phase and the lamination phase. Furthermore, as the pin rotates during the grinding and as the geometrical axis and the rotation axis can never perfectly coincide, a further oscillation of the parameter R will be caused in the process.

B— As the internal ring has been removed, one of the four variables that contribute to forming the quantity S is lacking and this, in itself, is equivalent to a variation in the parameter Si between the configuration of the bearing in the lamination phase and in the grinding phase.

C— The blockage of the external ring is effected by means of the rolling elements and consequently the radial blocking forces are discharged onto the external ring at discrete points. This causes a variation in the form of the external ring which, during the grinding, is processed in a loading and deformation situation which is completely different from that which takes place when the bearing is assembled in the rolling mill. This can lead to a variation in the quantity d+Se between the working phase in the rolling mill and in the grinding phase.

D— In conclusion, from an analysis of points A, B and C, it is evident that all the variables that contribute to determining the distance between the contact point P and the centre of the pin, vary between the lamination phase and the grinding phase, and this makes it extremely problematic to keep the oscillation of the quantity S within the desired limits.

E— If the pin is assembled on a grinding machine whose tip is decoupled with respect to the drive disc, it will be necessary to use rotating tips for supporting it, whose oscillation must be added to the errors described above for determining the total oscillation error. A fixed tip can obviously be used even if the drive disc and tip are decoupled with respect to each other but, in this case, there will be limitations in the maximum rotation rate that can be obtained due to the danger of overheating between the tip (which, as it is integral with the "piece-holder head", does not rotate) and the centre formed on the pin (which rotates). Finally, the inevitable oscillation error of the pin must be taken into account, as there is a relative rotational movement between the pin and the tip supporting it.

F— The entrainment of the pin can only take place using the "piece-holder head" of the grinding machine and this method, due to its very nature, discharges unbalanced radial forces onto the pin itself, which cause a further error in the process.

Another known alternative is the assembly of the external ring alone on the supporting pin (see FIG. 14).

In this application, the temporary fitting of the external ring is effected with mechanical means as represented in the figure (where, by screwing one of the two ferrules, the two internal rings are moved towards each other, which, as they have conical outer surfaces, press against the respective external rings causing an increase in their diameter).

It is obviously possible to also use hydraulic devices exploiting the same principle described in FIGS. 11 and 12. With respect to the case described in FIG. 10, where the bearing is assembled complete with the external ring blocked, this solution has the advantage that, as the internal ring of the bearing is missing, the radial clamping forces are extremely limited and allow the use of mechanical devices.

Furthermore, with respect to the cases previously described, as the rolling elements are removed before the grinding, the radial clamping forces are discharged onto the external ring continuously and not discretely.

Despite these advantages which substantially consist in expedients having a constructional simplicity, this solution has a series of disadvantages which can be summarized as follows:

A— The coupling between the pin and internal clamping ring, even if precise, must allow the relative axial movement between the parts, and this, in itself, causes a variation in the parameter R with respect to the conditions of the bearing in the rolling mill. Furthermore, as the pin is rotating during the grinding and as the geometrical axis and rotation axis can never perfectly coincide, a further oscillation of the parameter R will be caused in the process.

B— As both the internal ring and the rolling elements have been removed, the variables Si and d are missing and this can cause a variation in the same between the lamination phase and grinding phase.

C— The present solution assumes the use of clamping rings which are radially deformed during the blocking process. Even assuming that these rings have been processed as carefully as possible, their radial deformation will create in the external ring, a deformation state which is different from that in the lamination phase.

D— In conclusion, it is evident from the analysis of points A,B and C that all the variables that contribute to determining the distance between the contact point P and the centre of the pin, vary between the lamination phase and the grinding phase, and this makes it extremely problematic to keep the oscillation of the quantity S within the desired limits.

E— If the pin is assembled on a grinding machine whose tip is decoupled with respect to the drive disc, it will be necessary to use rotating tips for supporting it, whose oscillation must be added to the errors described above for determining the total oscillation error. A fixed tip can obviously be used even if the drive disc and tip are decoupled with respect to each other but, in this case, there will be limitations in the maximum rotation rate that can be obtained due to the danger of overheating between the tip (which, as it is integral with the "piece-holder head", does not rotate) and the centre formed on the pin (which rotates). Finally, the inevitable oscillation error of the pin must be taken into account, as there is a relative rotational movement between the pin and the tip supporting it.

F— The entrainment of the pin can only take place using the "piece-holder head" of the grinding machine and this method, due to its very nature, discharges unbalanced radial forces onto the pin itself, which cause a further error in the process.

An analysis of all the methods previously described, reveals a common feature: in all the cases, the reduction in the clearance p of the bearing, or the blockage of the bearing itself for allowing its rotation integrally with the pin supporting it, takes place by the application of axial-symmetric radial forces (FIG. 12) whose purpose is to reduce, or annul the radial clearance p of the bearing uniformly along the whole circumference.

This, in itself, causes the bearing, during the grinding, to be subjected to a loading and deformation regime which is different from that to which it is subjected during the processing in the rolling mill, therefore introducing systematic oscillation errors of the bearing into the processing itself. These oscillation errors, in fact, represent a limitation of both the productivity of the rolling mill and the quality of the laminate.

A general objective of the present invention is to solve the main drawbacks of the known art indicated above in an extremely simple, economical and particularly functional manner.

A further objective of the present invention is to is to provide equipment for the grinding of external rings of roller bearings, in particular used in rolling mills. More specifically, equipment which exactly reproduces the same loading and deformation conditions to which the bearing is subjected when it is inserted in the same rolling mill.

Another objective of the present invention is to provide equipment in which the oscillation of the comparator is minimized during the measurement phase, consequently minimizing the oscillation of the quantity S previously indicated during the lamination, optimizing the performances of the rolling mill itself.

Yet another objective of the present invention is to provide a grinding machine in which newly developed equipment can be used for the grinding of roller bearings for rolling mills.

In view of the above objectives, according to the present invention, equipment and a machine have been conceived, having the features specified in the enclosed claims.

The structural and functional characteristics of the present invention and its advantages with respect to the known art will appear even more evident from the following description, referring to the enclosed drawings, which, inter alia, show a schematization of an embodiment of equipment produced according to the same invention, and a relative machine. In the drawings.

Figure 9B:
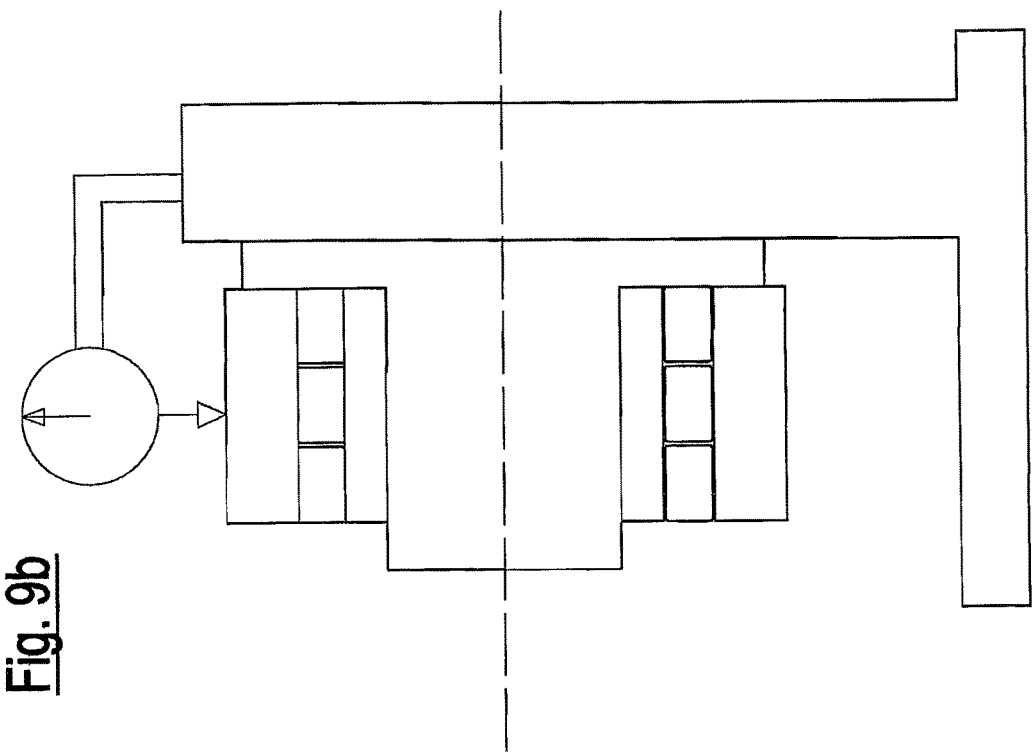
Figure 9A:
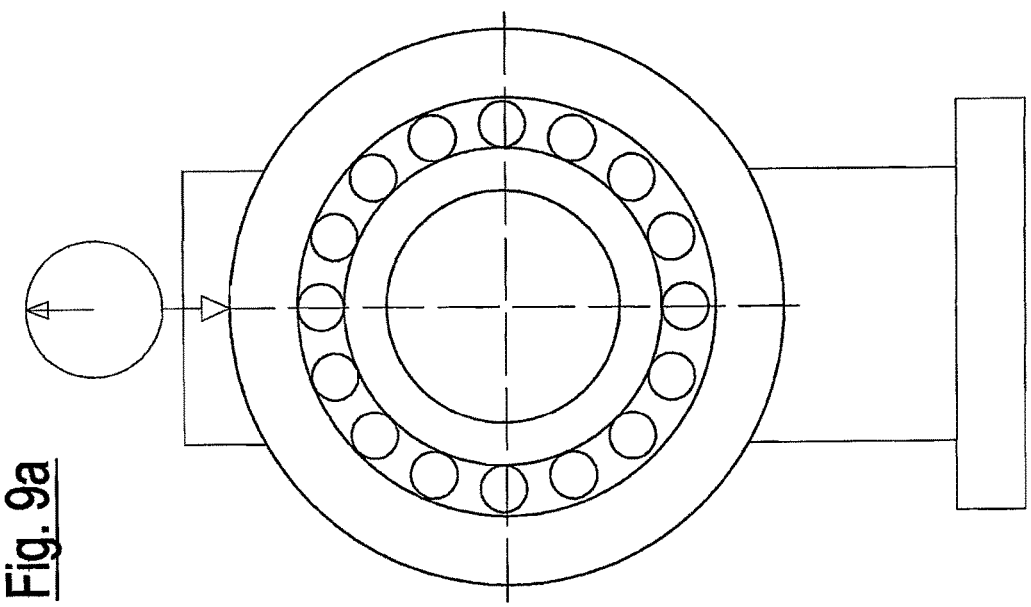
Figure 10:
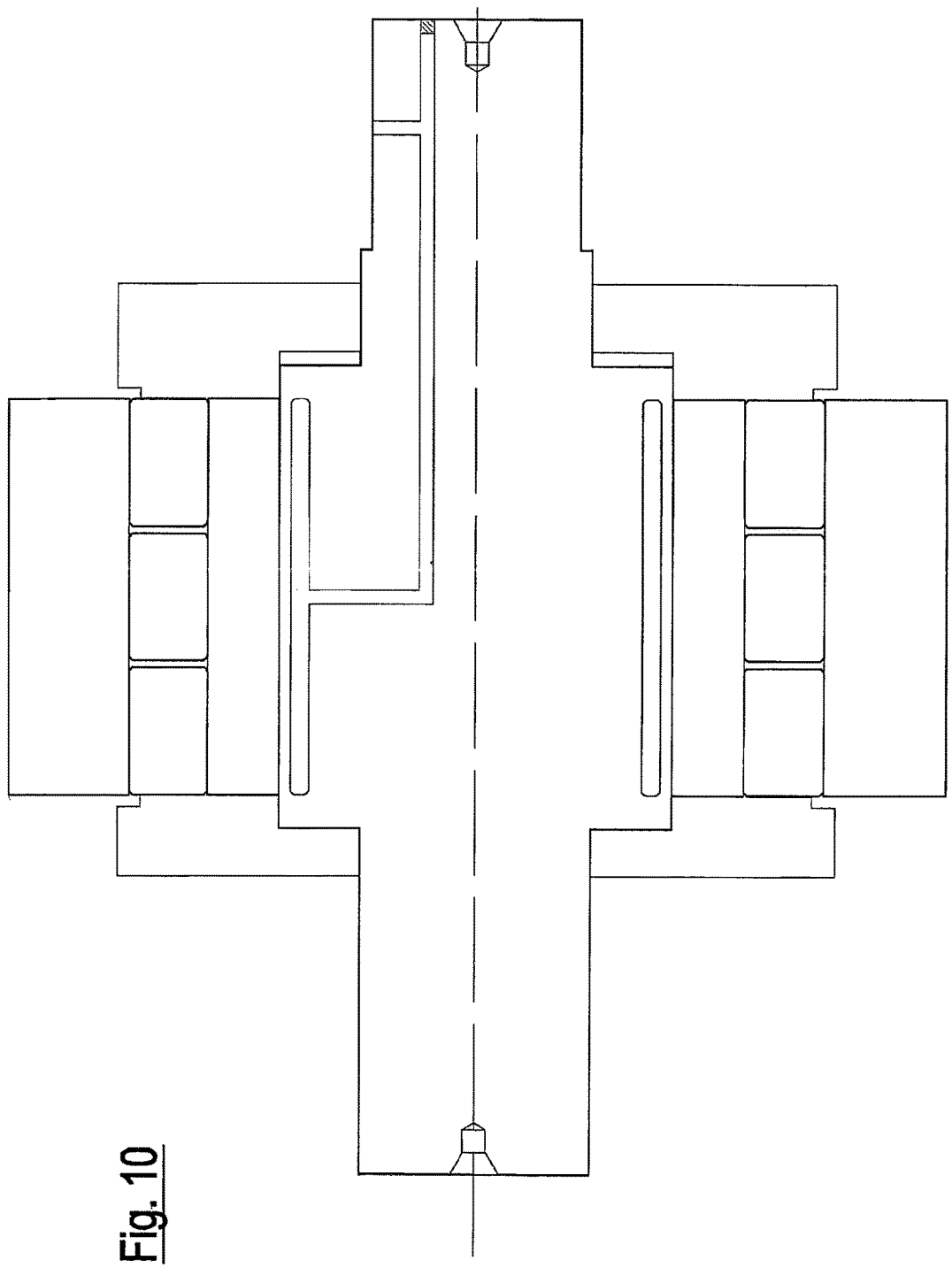
Figure 11:
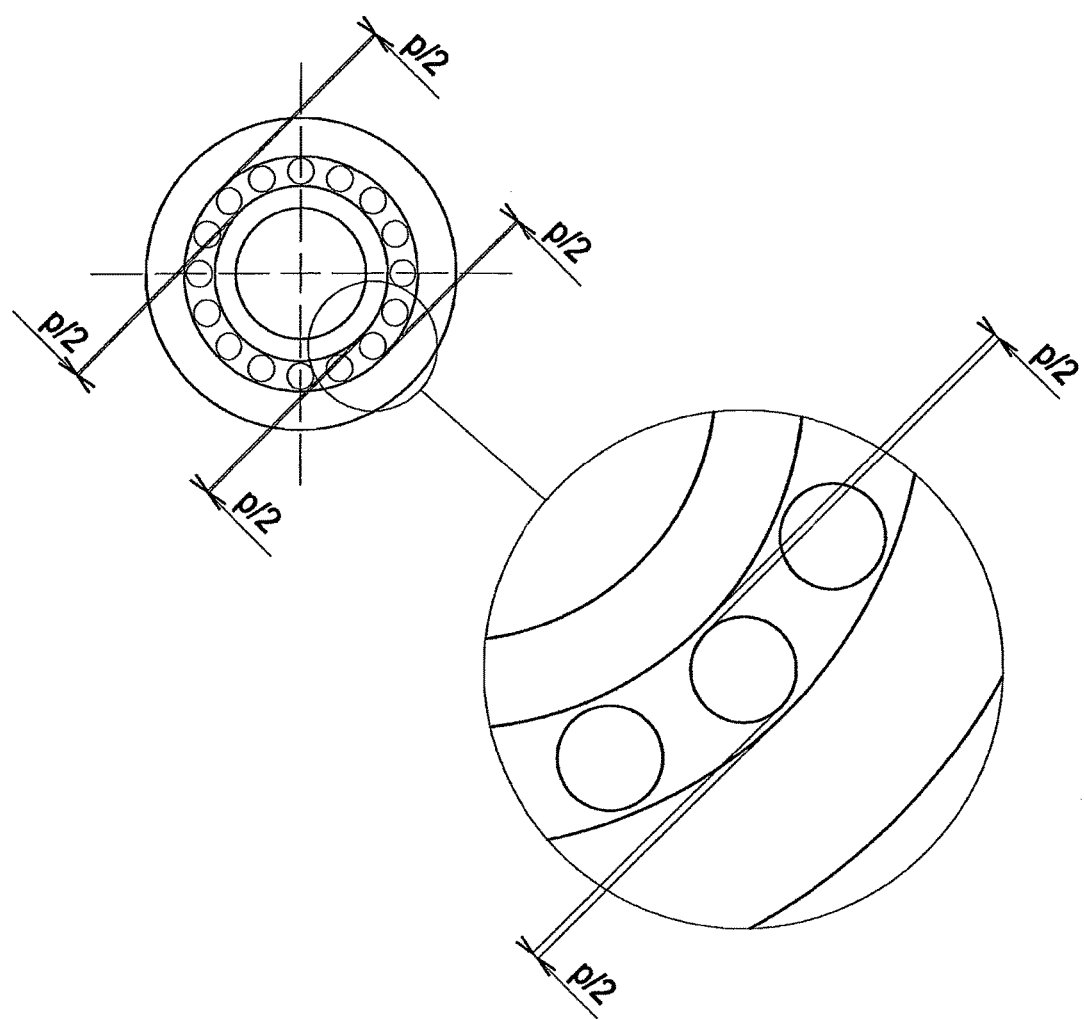
Figure 12:
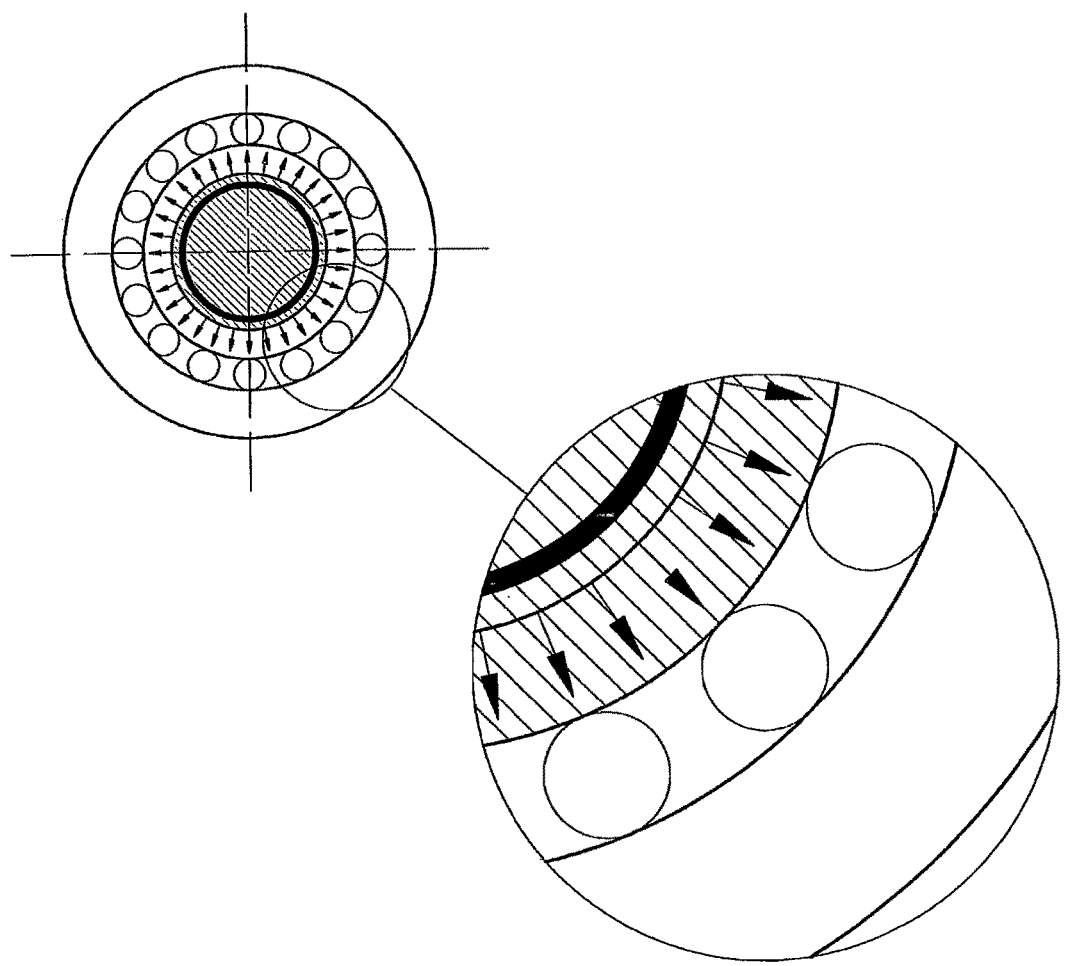
Figure 13:
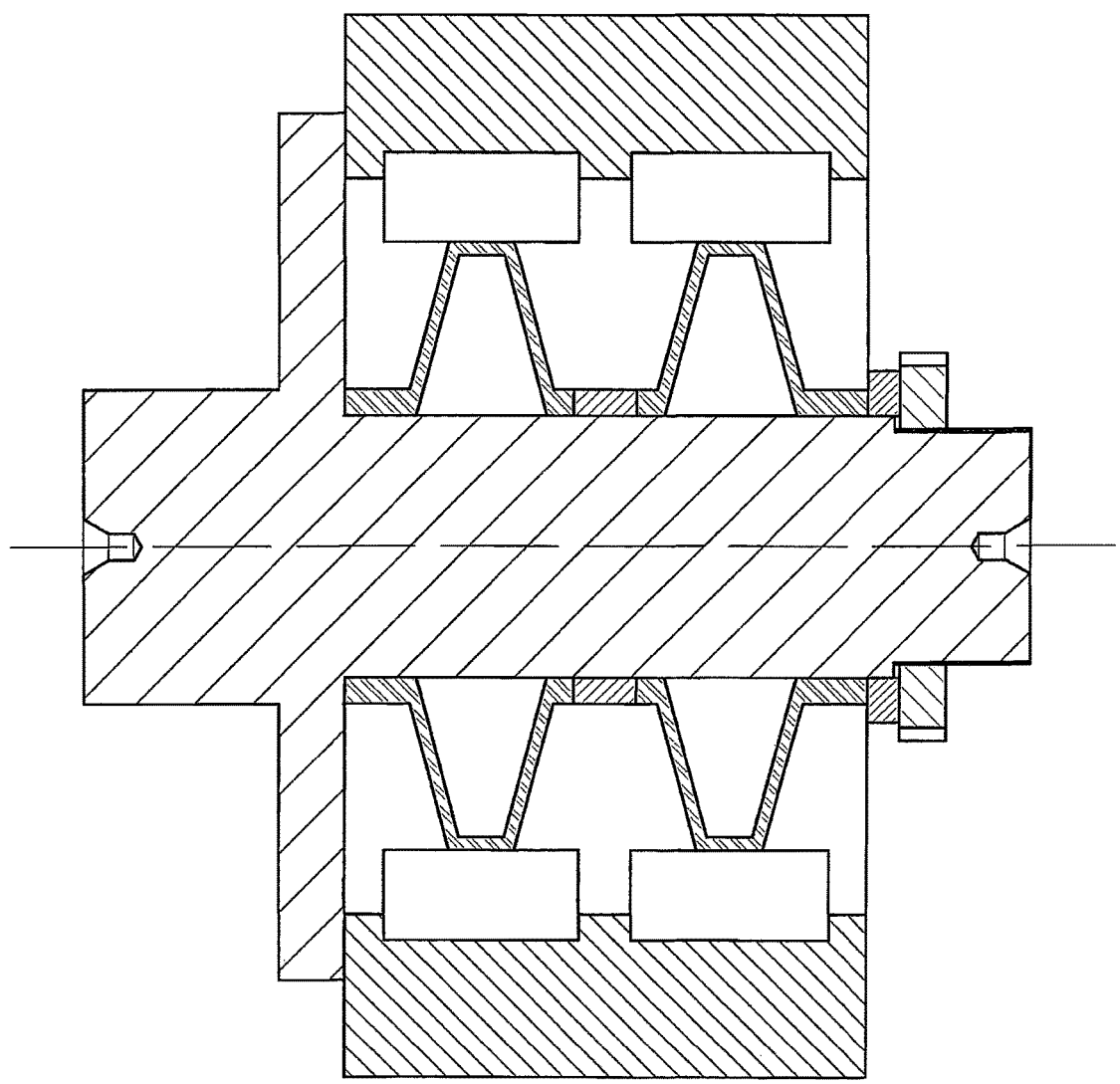
Figure 14:
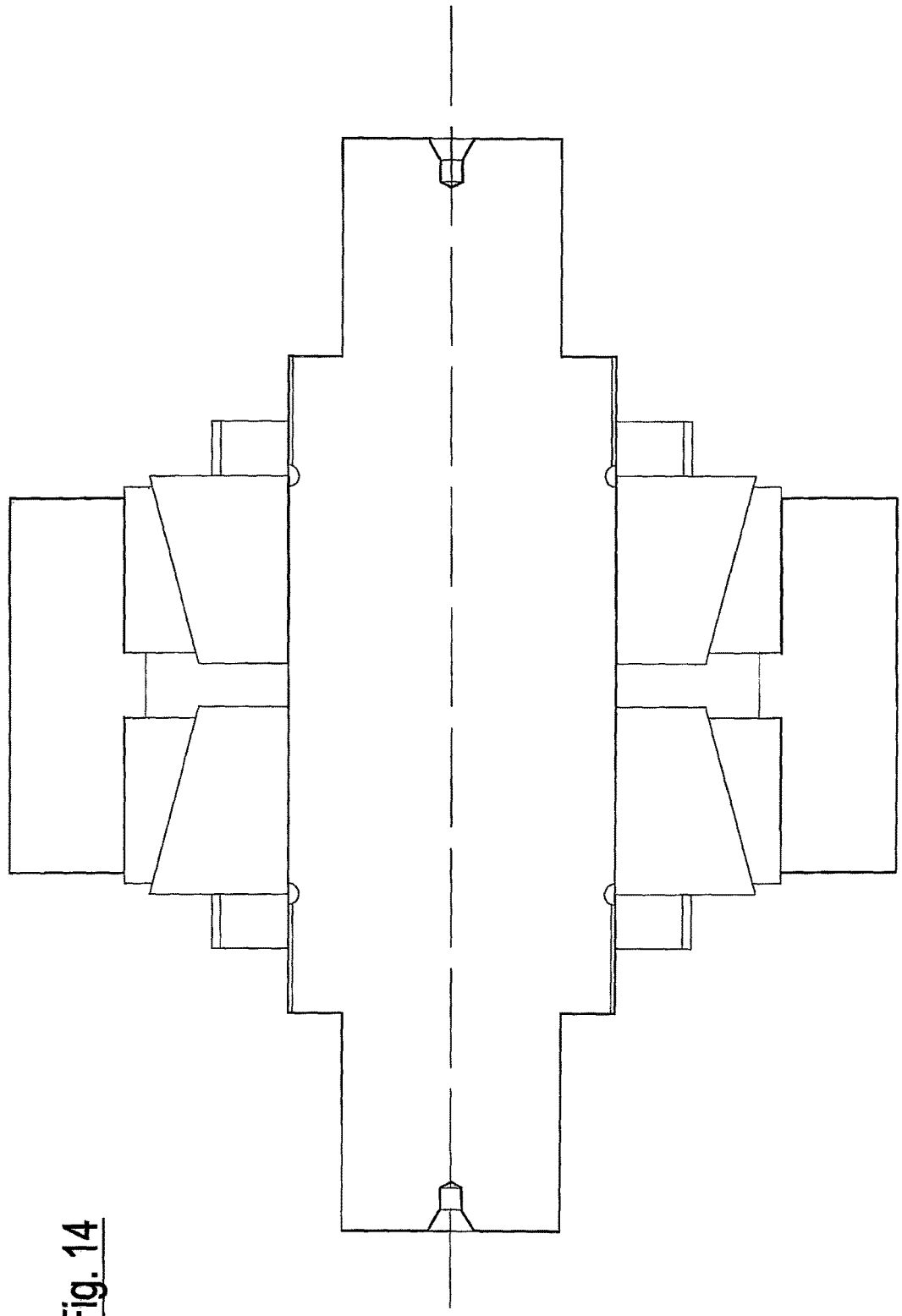
Figure 15A:
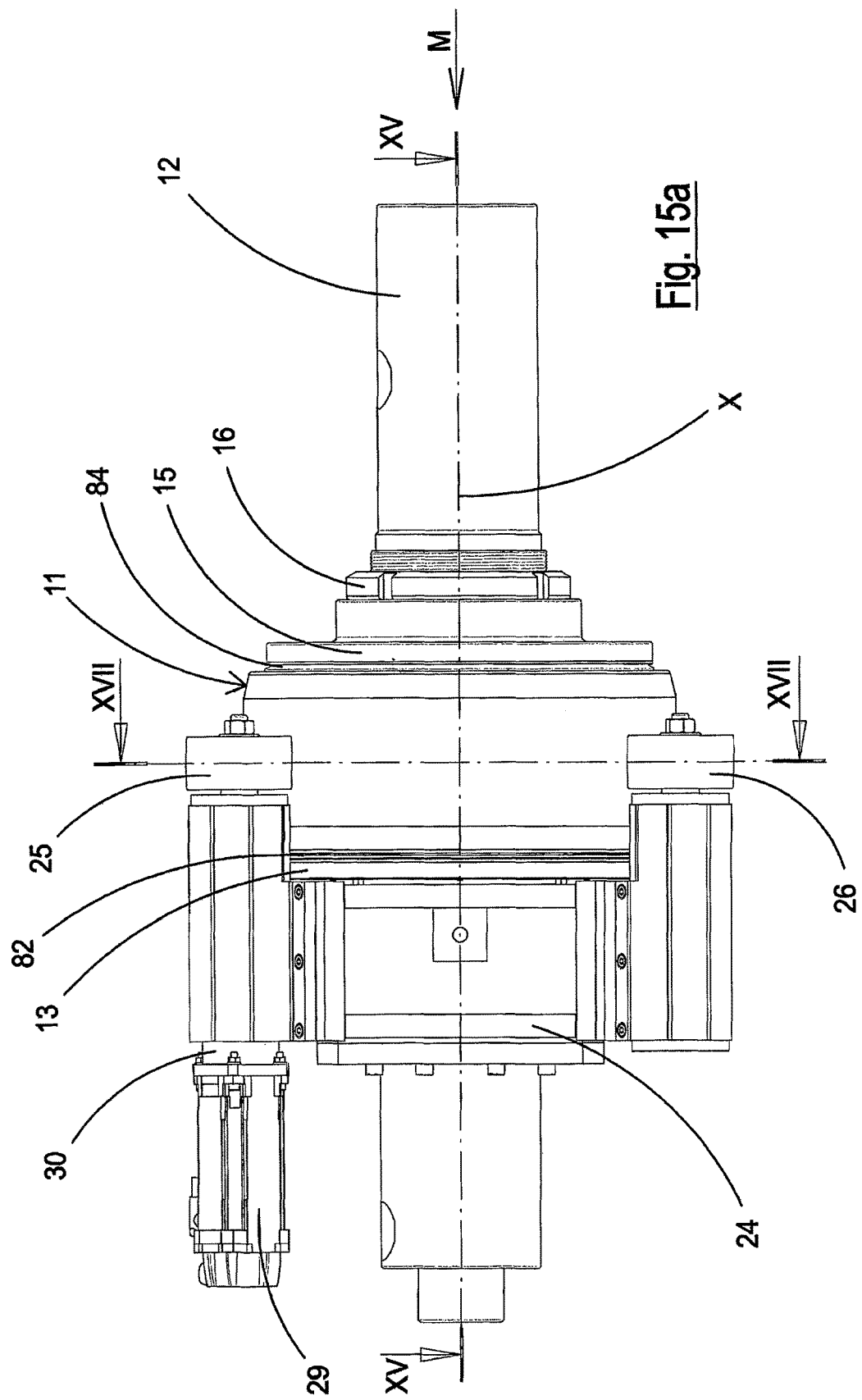
Figure 15B:
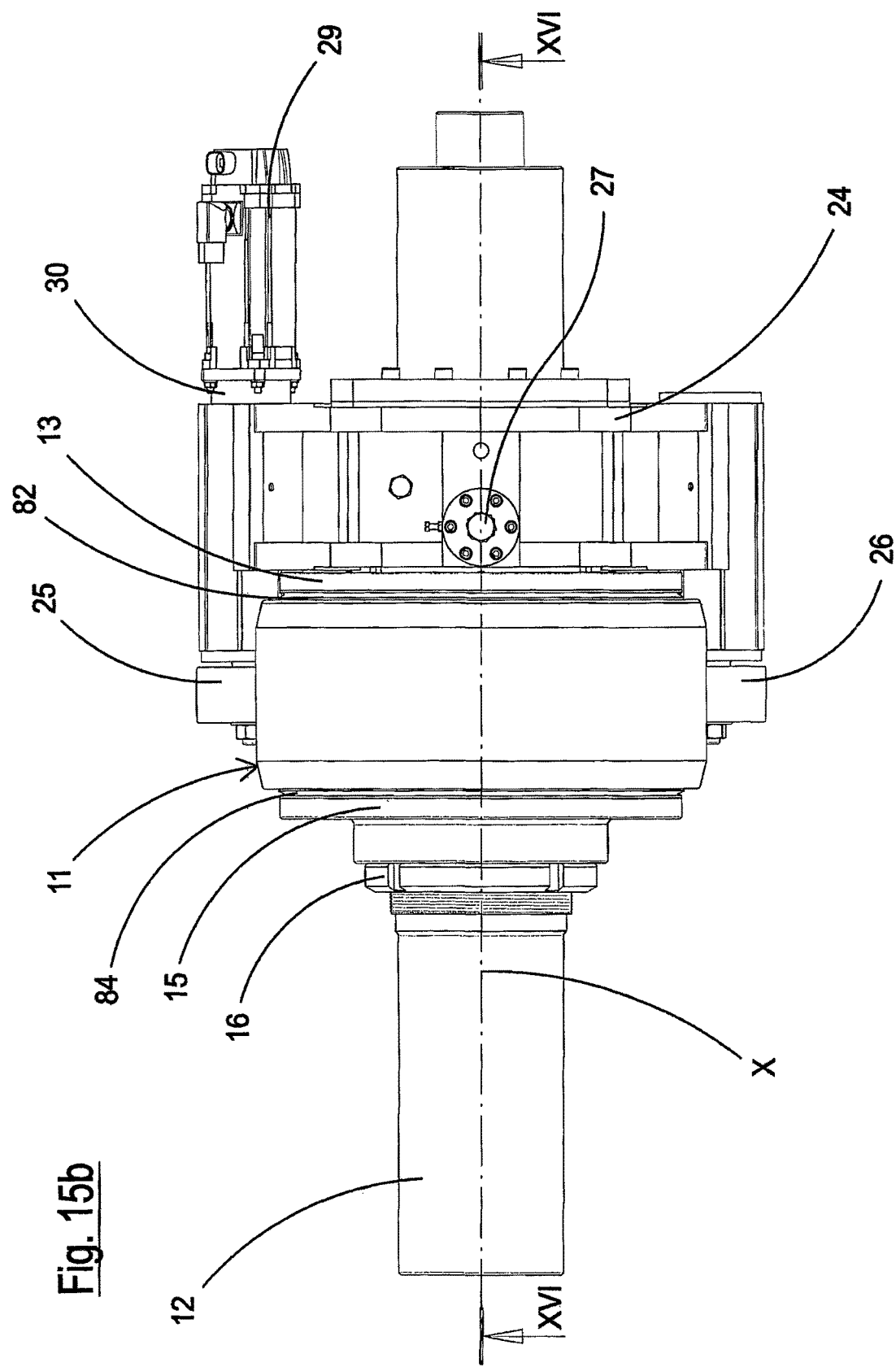
Figure 16C:
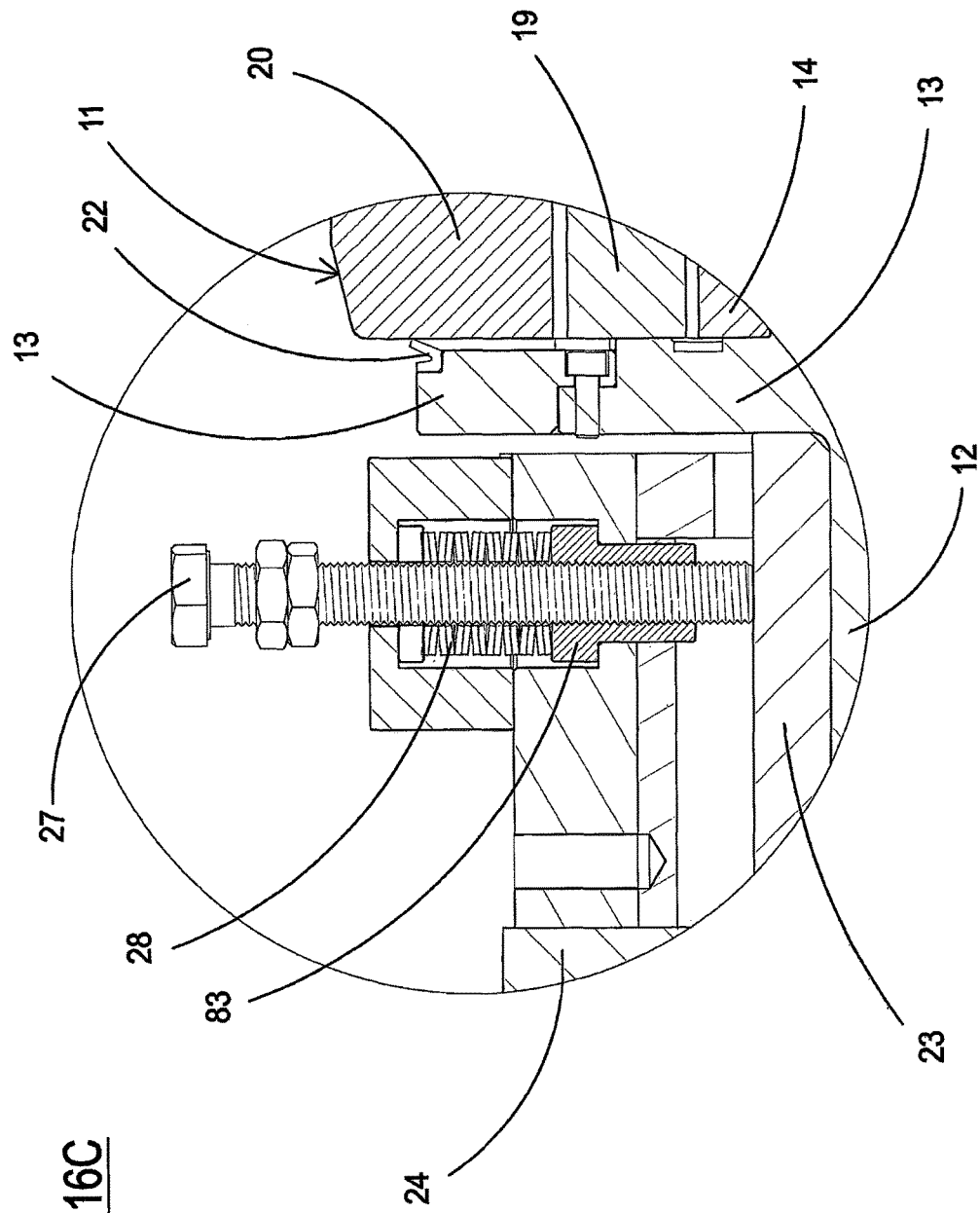
Figure 18:
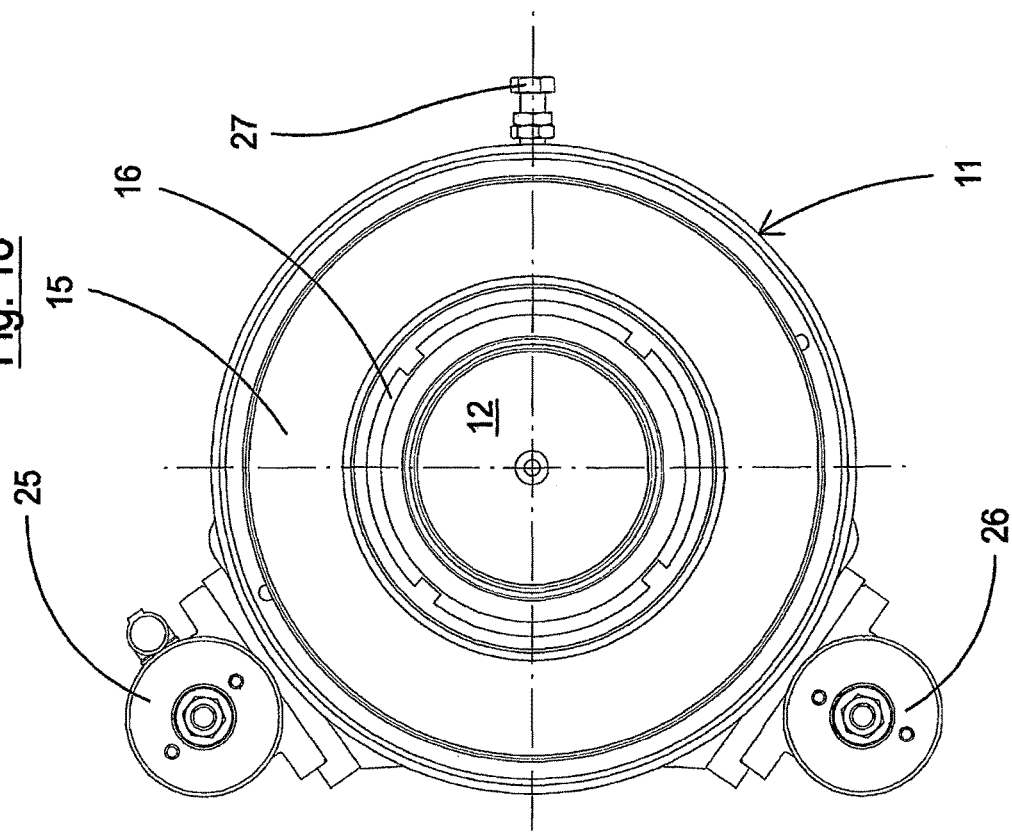
Figure 17:
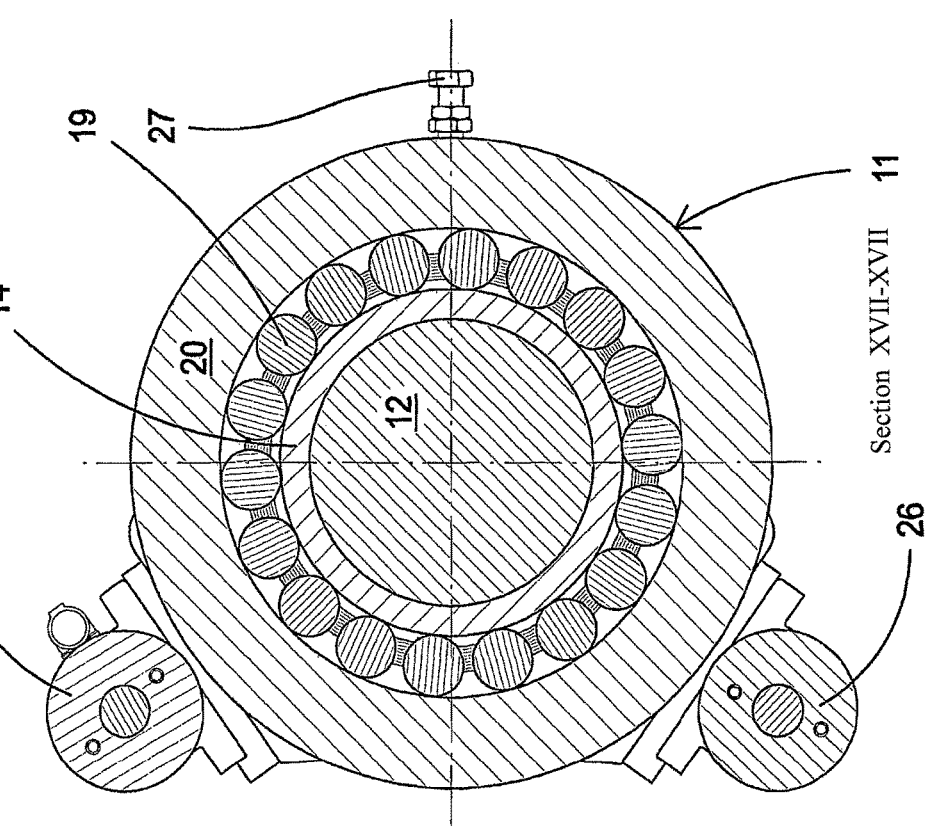
Figure 19B:
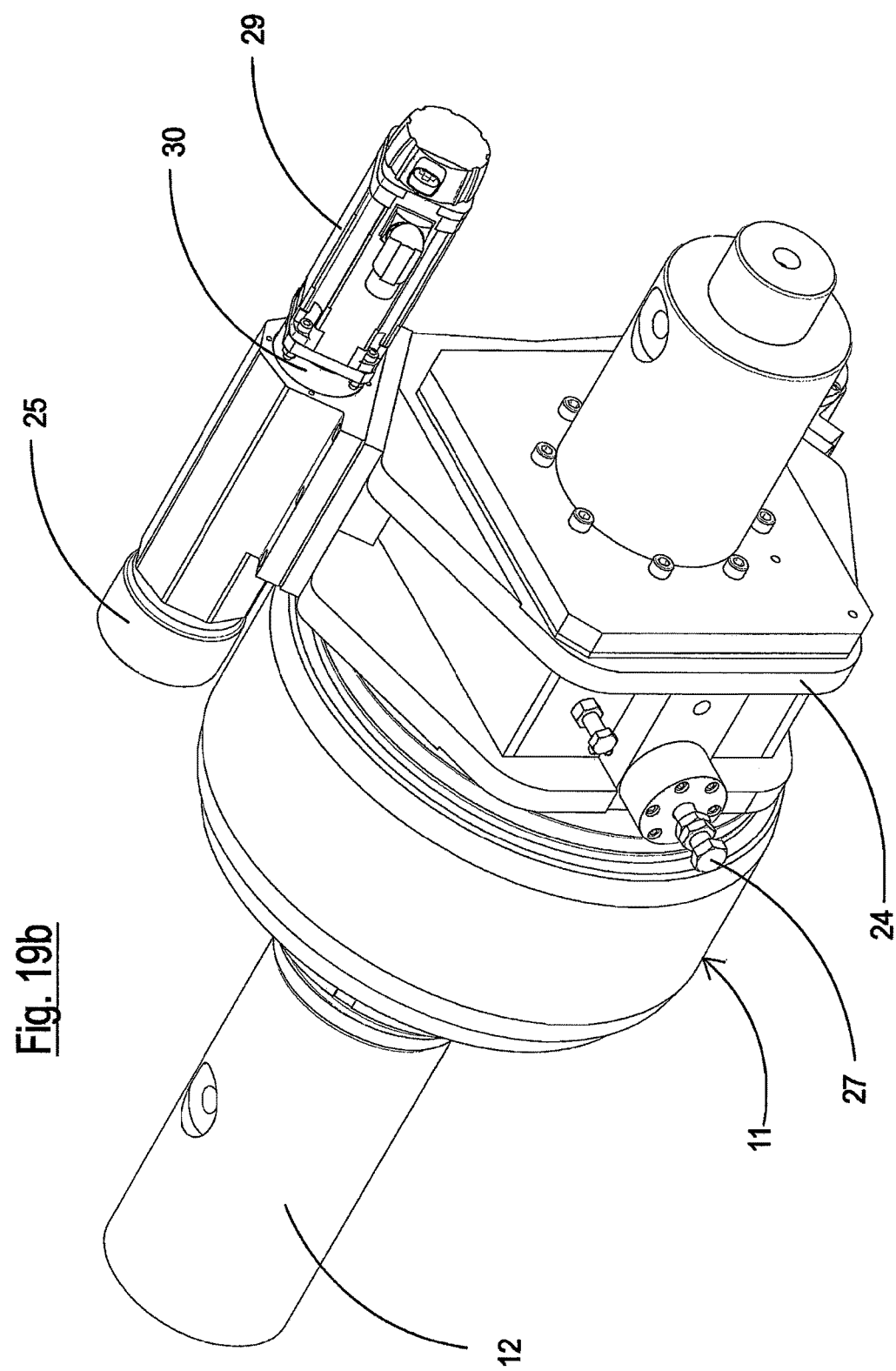
Figure 21:
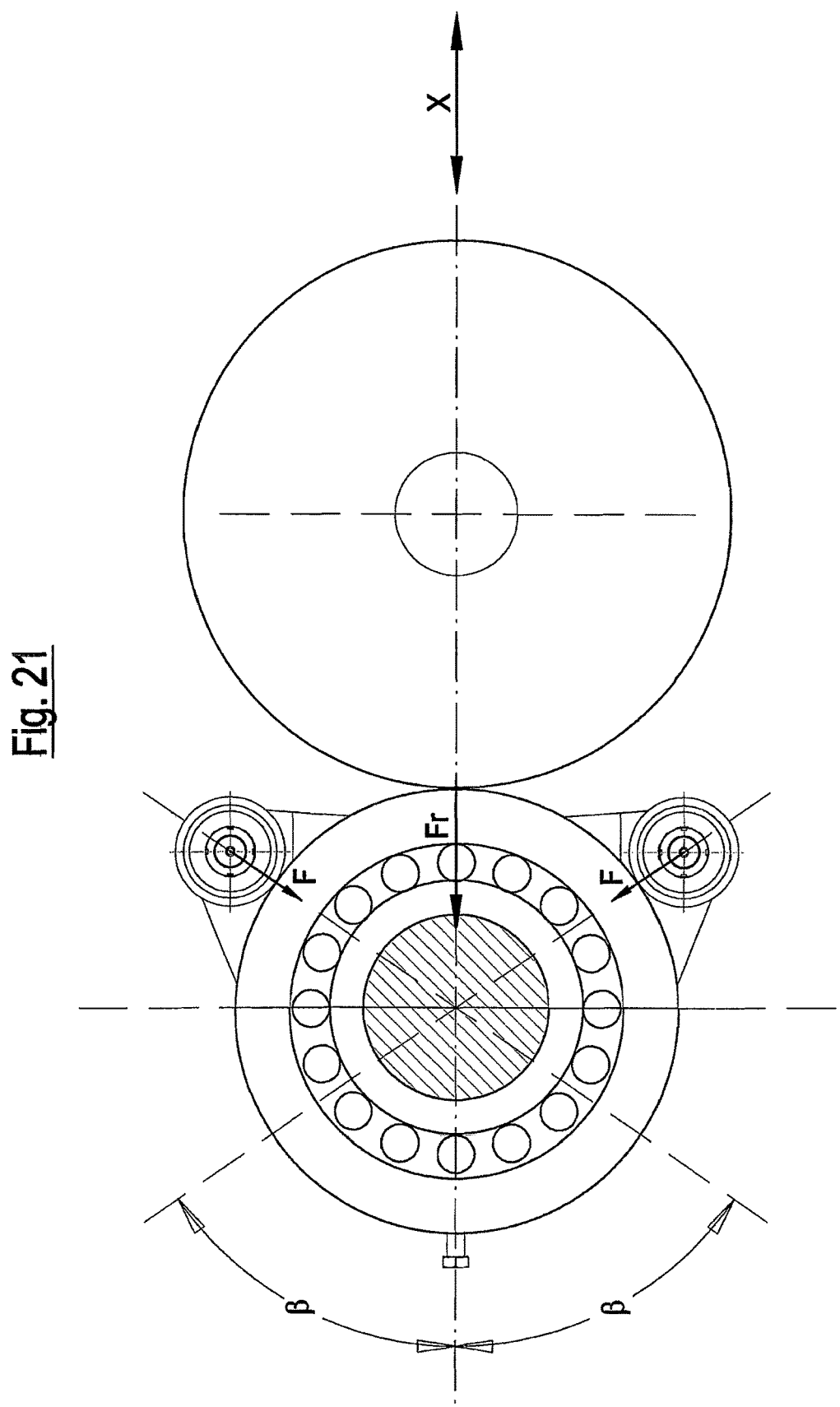
Figure 22:
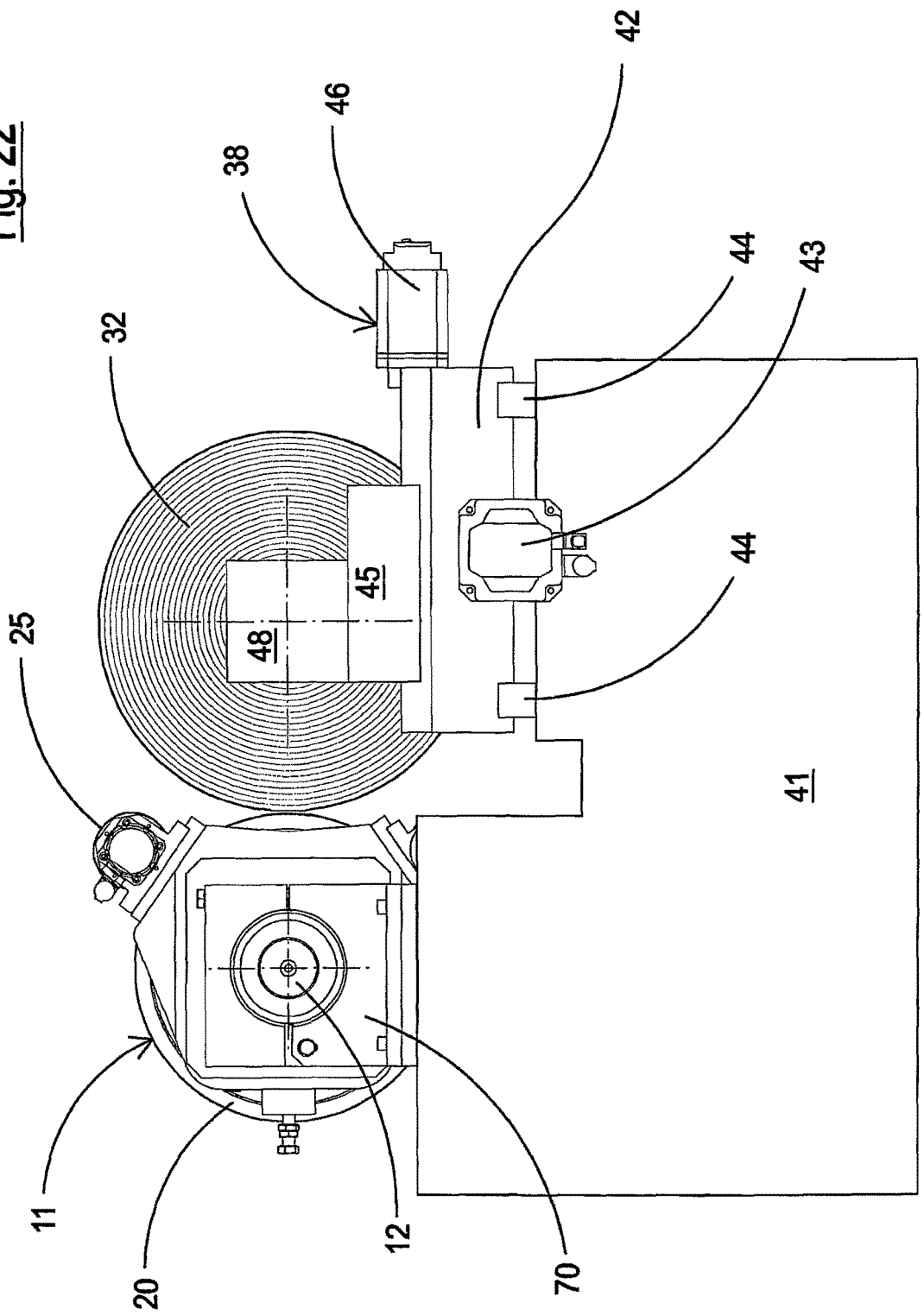
Figure 23:
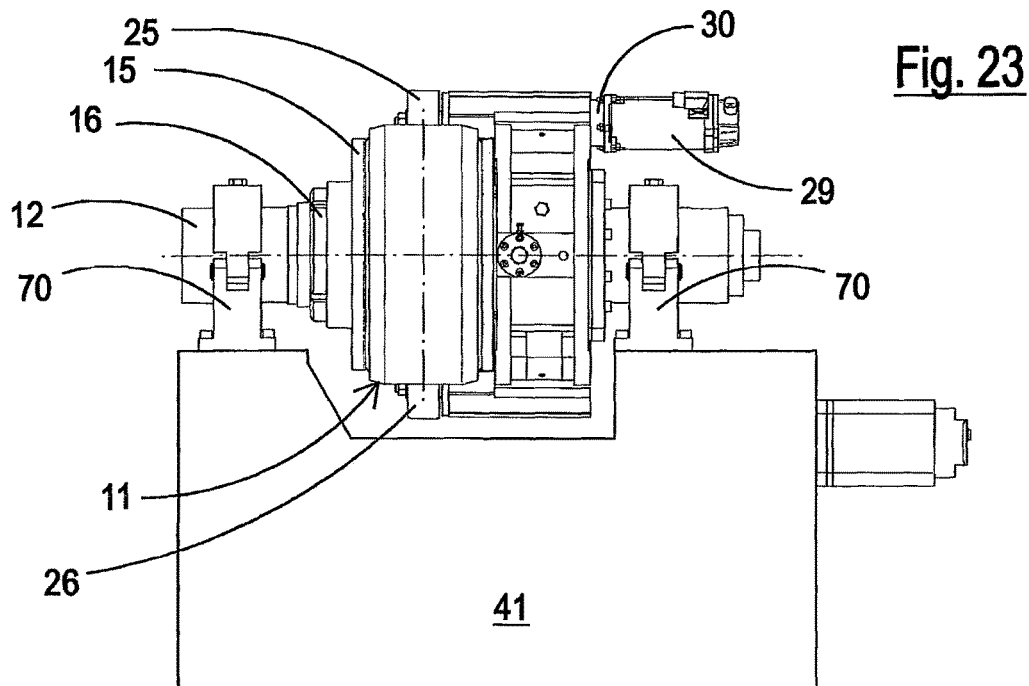
Figure 24:
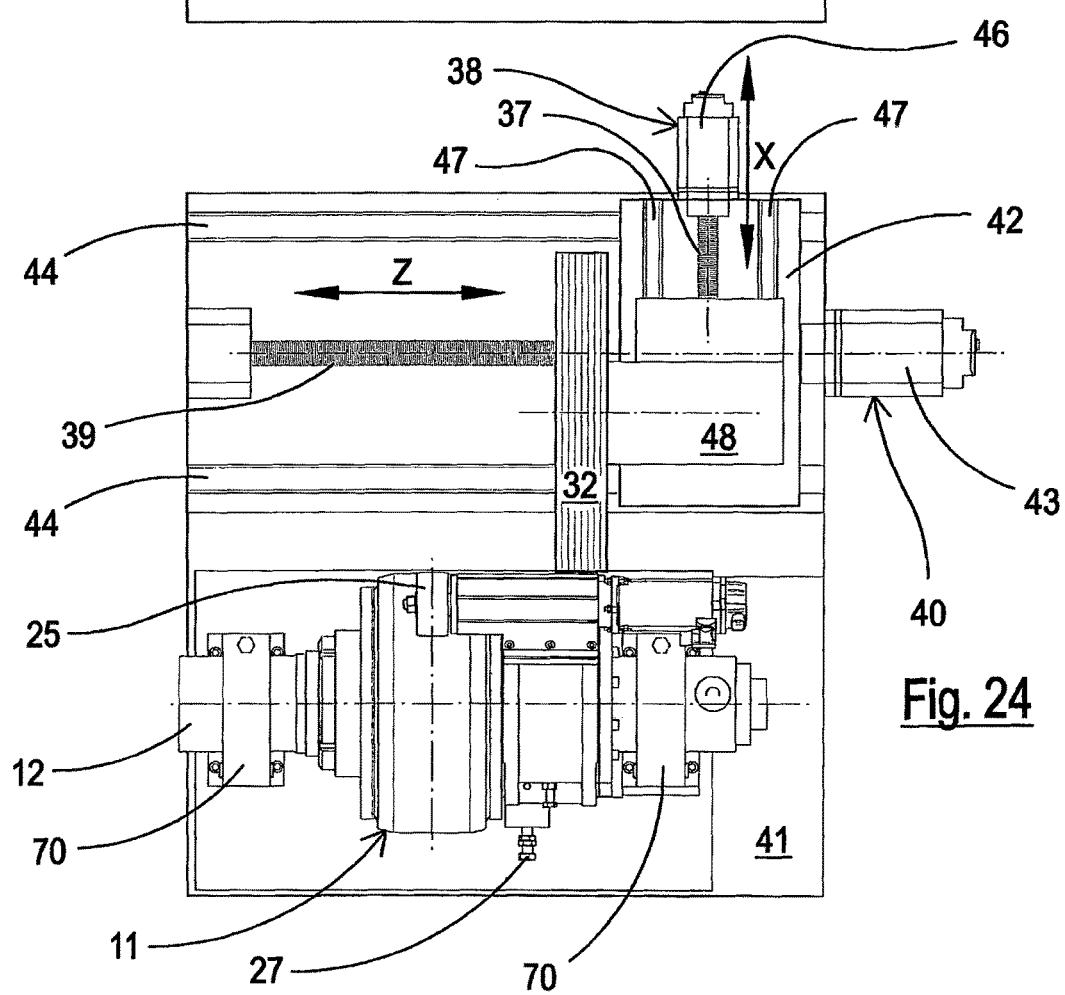
Figure 25:
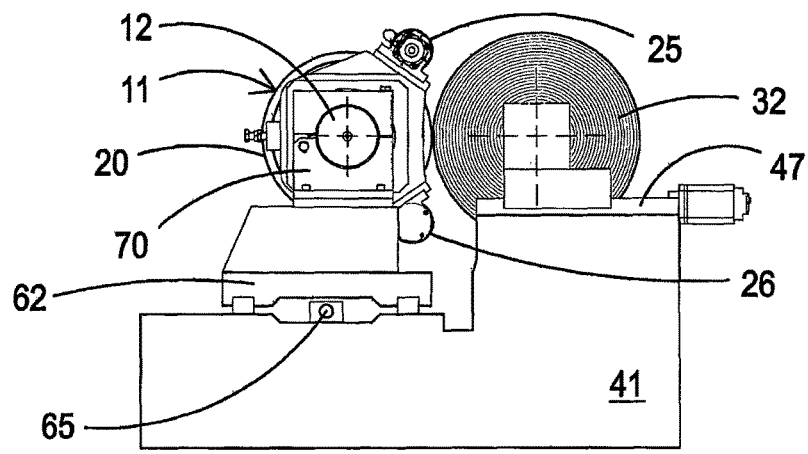
Figure 26:
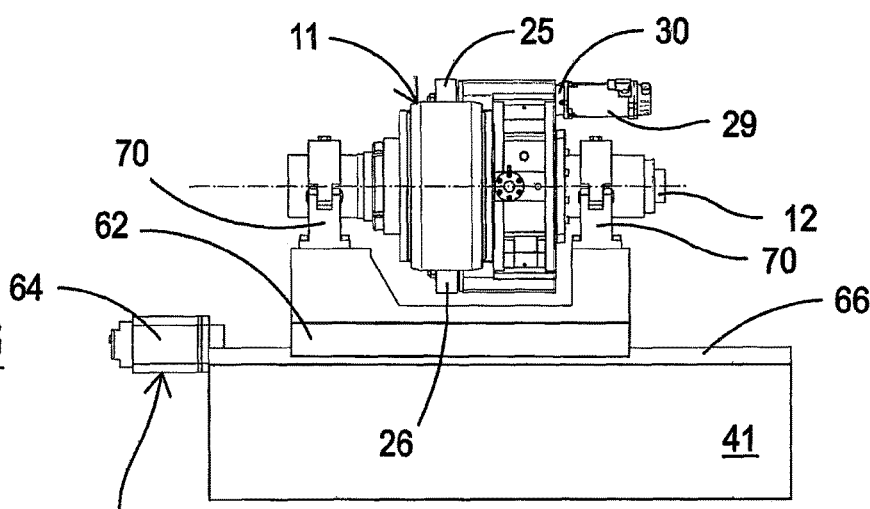
Figure 27:
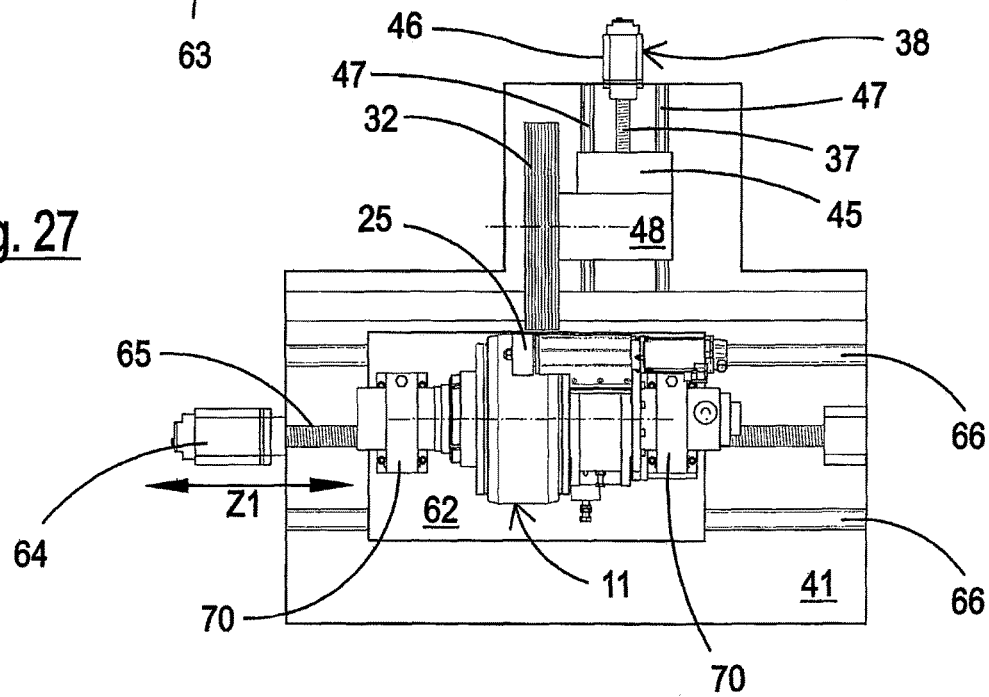

FIGS. 9*a* and 9*b* show, in schematic form, a measurement instrument of a "back-up ring" after grinding;

FIG. 10 shows, in a sectional view, the assembly of a complete bearing on a pin of equipment that can be used on a grinding machine;

FIGS. 11 and 12 show sections in which a free bearing and a bearing assembled on a pin, respectively, can be observed;

FIG. 13 shows a view in which a bearing is assembled on a pin without an internal ring;

FIG. 14 shows, in a sectional view, the assembly of only one external ring of a bearing on a pin of equipment that can be used on a grinding machine;

FIGS. 15*a* and 15*b* show two opposite side views of equipment according to the invention to be applied to a grinding machine;

FIGS. 16*a*, 16*b* and 16*c* represent longitudinal sections of the equipment shown in FIGS. 15*a* and 15*b* according to the lines XV-XV, XVI-XVI and a detail;

FIG. 17 is a sectional transversal view of the equipment according to the lines XVII-XVII of FIG. 15*a*;

FIG. 18 is an end view of the equipment according to the arrow M of FIG. 15*a*;

FIGS. 19*a* and 19*b* are perspective views of the equipment of FIGS. 15*a* and 15*b*;

FIG. 20 is a further perspective view, but partially cross-sectional and with another angulation for showing other constructional and functional details of the equipment of FIGS. 15*a* and 15*b*;

FIG. 21 shows how the equipment of the present invention, such as that illustrated in FIGS. 15*a* and 15*b*, is associated with a grinding schematized in a grinding wheel;

FIGS. 22, 23 and 24 show an embodiment of a machine for the grinding of roller bearings which uses the equipment of the previous figures from 15 onwards;

FIGS. 25, 26 and 27 show a further embodiment of a machine for the grinding of roller bearings which also uses the equipment of the previous figures from 15 onwards.

With reference to FIG. 15 onwards and with respect to what is specified above, a non-limiting embodiment of equipment according to the present invention, is illustrated.

This is equipment for the grinding of external rings of roller bearings, in particular for rolling mills.

The figures show how a roller bearing 11 is mounted, fully assembled, on a supporting pin 12. The axial positioning of the roller bearing 11 is guaranteed by a stop 13 which extends outwardly from the supporting pin 12. In particular, in the example shown, the stop is of the annular type 13 and extends radially from the side surface of the pin in the form of a flanging of the supporting pin 12.

A side of an internal ring 14 of the bearing 11 rests in correspondence with said stop 13, which is withheld also in correspondence with the second side, by means of a flange 15 and a clamping nut 16.

In particular, the clamping nut 16 is positioned, for example screwed, on a complementary threaded portion of the pin 12. The flange 13 carries, in the side facing the bearing, a series of recesses with an axis parallel to the axis of the pin 12; a skid 18 is housed in each of the recesses and a spring 82 is applied between the recess and the skid. Likewise, the flange 15 carries a series of similar recesses, in each of which a skid 17 and a spring 21 are housed. The radial position of said recesses on the flanges 13 and 15 is studied so as to ensure that once the assembly of the bearing is complete, the skids 18 and 17 are in contact with the sides of the external ring 20. The function of the flanges 13 and 15 is to guarantee the axial blockage of the internal ring 14, once the nut 16 has been fully tightened. Furthermore, during the tightening, the skids 18 and 17 are pressed against the sides of the external ring 20 and the springs 82 and 21 are suitably preloaded, packing the external ring 20 so that the whole unit guarantees a sufficient axial stability of said ring, at the same time enabling it to rotate on the rolling elements 19. Suitably shaped gaskets 84 and 22 are also envisaged, interposed between elements of the bearing and flanges 13 and 15, which prevent the coolant used during the grinding process from entering the internal parts of the bearing 11.

The pin 12, on the opposite side to where the nut 16 is positioned with respect to the stop 13, carries a guiding element which forms a prismatic seat 23 and acts specifically as a guide for a supporting structure of a pair of contrast rolls 25 and 26. Said structure 24 can slide, supported by the prismatic guiding seat 23, in a radial direction and parallel to the grinding axis X, wherein grinding axis X refers to the direction along which the wheel moves for approaching or moving away from the bearing to be ground (FIG. 21), to allow, after the assembly of the bearing 11, the contrast rolls 25 and 26 to move towards the bearing 11 and exert a desired pressure on the external ring 20 of the same bearing, in the above direction X.

The approaching of the contrast rolls 25 and 26 towards the external ring 20 of the bearing 11 is effected by acting on a manoeuvring element 27. Said screw 27 is engaged in a threaded nut 83 inserted in the structure 24 and, once it has been caused to rotate in a clockwise direction, said screw 27 reacts by resting against the prismatic guide 23 making the axial movement of the screw itself along X impossible. The nut 83 must therefore react, and moves in an axial direction pulling the structure 24 with it and consequently also the rolls 25 and 26. When the two rolls 25 and 26 come into contact with the outer surface of the external ring 20, they push the external ring against the rolling elements 19 of the bearing 11 which, in turn, press against the internal ring 14 which is supported by the pin 12. When the packing of the three elements of the bearing has been effected, the relative movement along X between the structure 24 and the pin, is in fact no longer possible; it is however possible to modulate the load that the rolls 25 and 26 exert on the bearing according to the following description. The nut 83, in which the screw 27 is engaged, is not rigidly constrained to the structure 24 in a radial direction X, but can slide along this direction, as it is axially constrained by a set of springs 28. When the radial packing of the bearing has taken place and therefore the relative movement between the structure 24 and pin 12 is no longer possible, the nut 83 begins to slide in the direction X with respect to its seat 24, generating the compression of the springs 28. The preloading applied to the bearing is given by the product of the rigidity k of the springs times their deflection. The preloading limit is obviously given by the compression of the spring 28; when this is packed, a further action on the screw 27 would cause the blockage of the bearing.

The roll 25 can be rotated by means of an appropriate command, preferably an electric motor 29 and an adapter 30, whereas the roll 26 is assembled idle on the structure 24.

The functioning of the equipment of the present invention, from which its advantages with respect to the known art appear evident, is the following.

In a first phase, the following operating phases are effected, keeping the equipment on a bench.

The screw 27 is rotated in an anticlockwise direction, so that the rolls 25 and 26 are positioned at the maximum distance from the pin 12 itself.

The bearing 11, whatever type it may be (radial with one, two or three roll crowns, for example) is coupled with the pin 12 by means of a hole 31 of its internal ring 14. The tolerances of the diameter of the pin 12 are such as to allow an easy manual assembly. It should be noted that no preliminary operation on the bearing 11 is necessary, such as the dismantling of the internal ring 14 and/or of the rolling elements 19.

The flange 15 is subsequently assembled followed by the axial blockage of the internal ring 14 and containment of the rolling elements 19 and external ring 20 by the stable positioning of the nut 16.

The stable positioning of the bearing 11 on the pin 12 with respect to the equipment of the invention is therefore complete.

At this point, the equipment of the invention is positioned with the bearing 11 integral with it assembled on the grinding machine, schematized in FIG. 21 in a grinding tool, such as a wheel 32.

The pin 12 is assembled on specific supports or supporting lunettes of the grinding equipment 70.

At this point, without having to effect any alignment, the external ring 20 of the bearing 11 can be preloaded by means of the manoeuvring screw 27. When the rolls 25 and 26 are in contact with the external ring 20 of the bearing 11, a preloading can be applied which is such that the ring can still rotate if pulled manually.

In this simple way, the clearance between the external ring 20, rolling elements 19 and internal ring 14 of the bearing 11 are zeroed in the radial grinding direction X, without the application of an axial-symmetrical field of forces, but applying only two radial forces that pass from the centre of each roll 25 and 26 to the centre of the pin 12, resulting in a horizontal force which is calculated as follows with reference to FIG. 21 according to the formula:

$$Fr = 2*F \cos \beta$$

Figure 1:
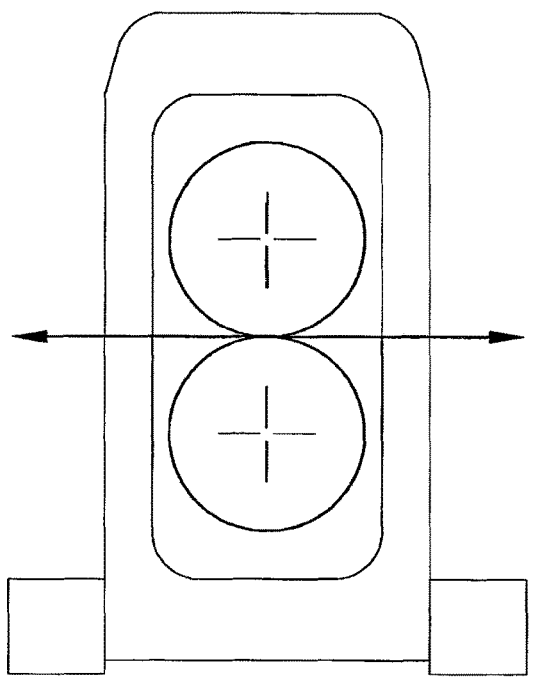
FIGS. 1 to 5 show some types of known rolling mills in schematic form.
Figure 2:
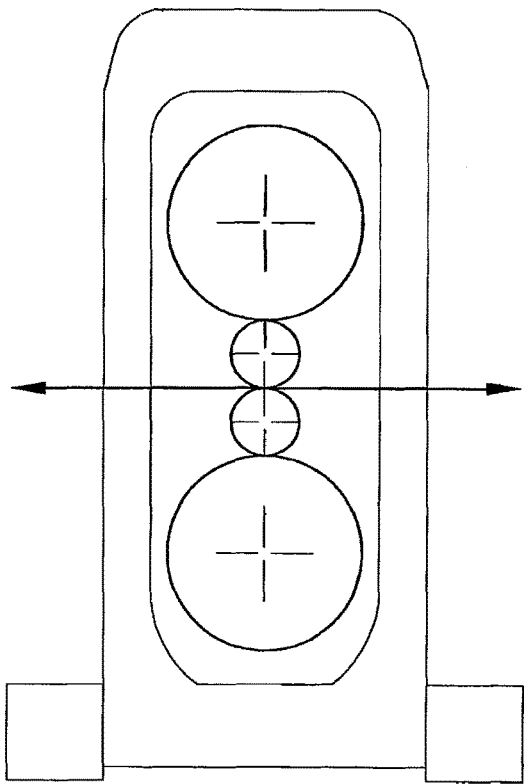
Figure 3:
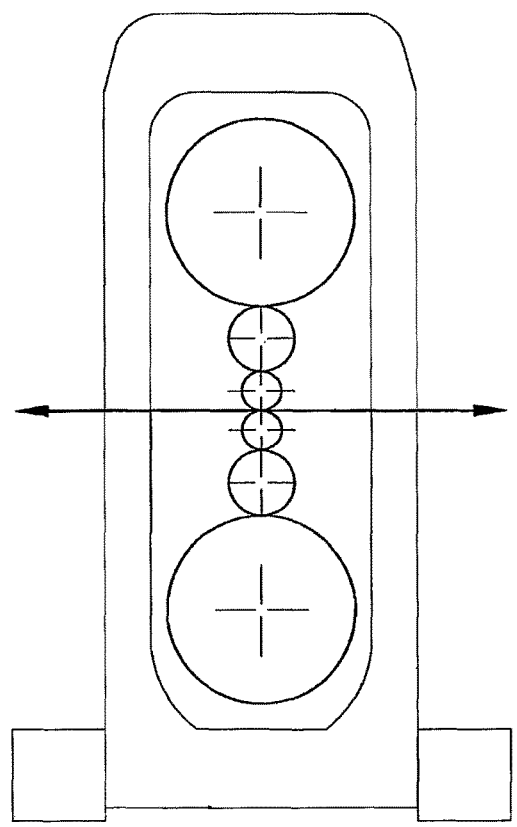
Figure 4:
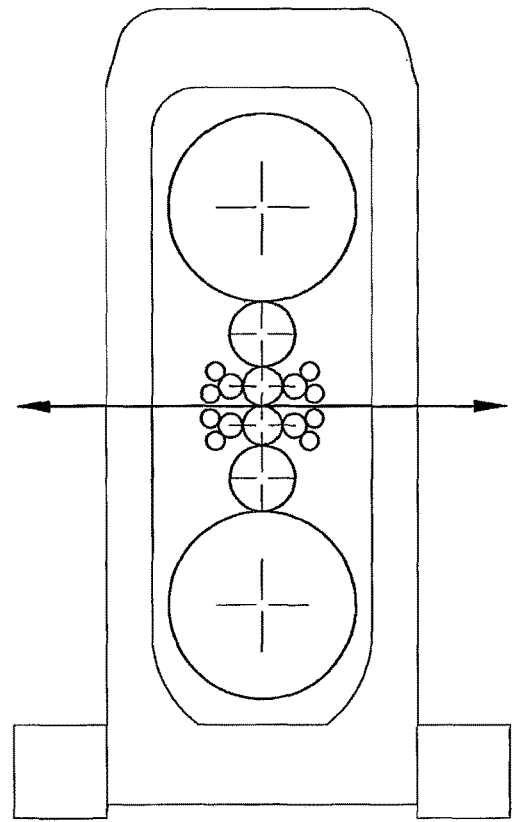
Figure 5:
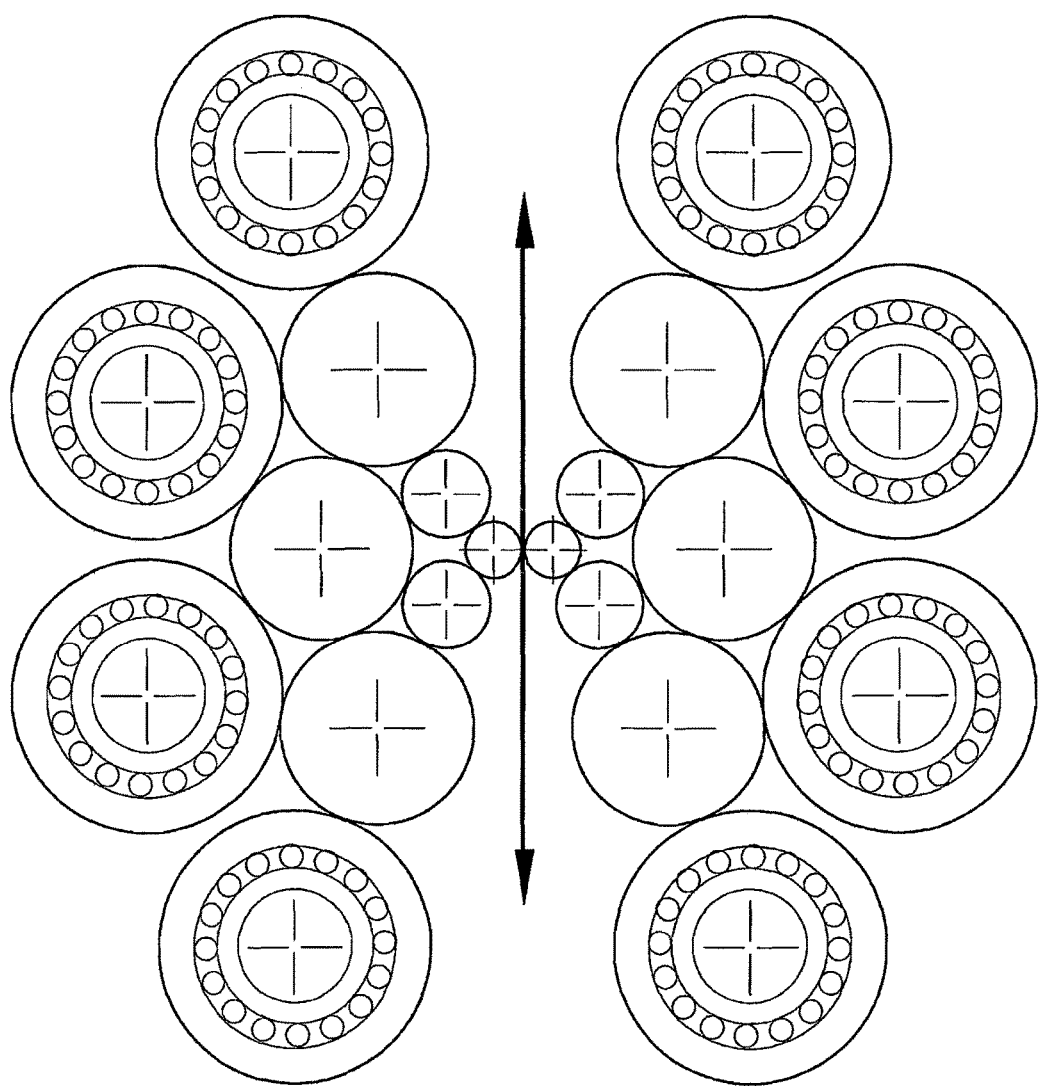
Figure 6:
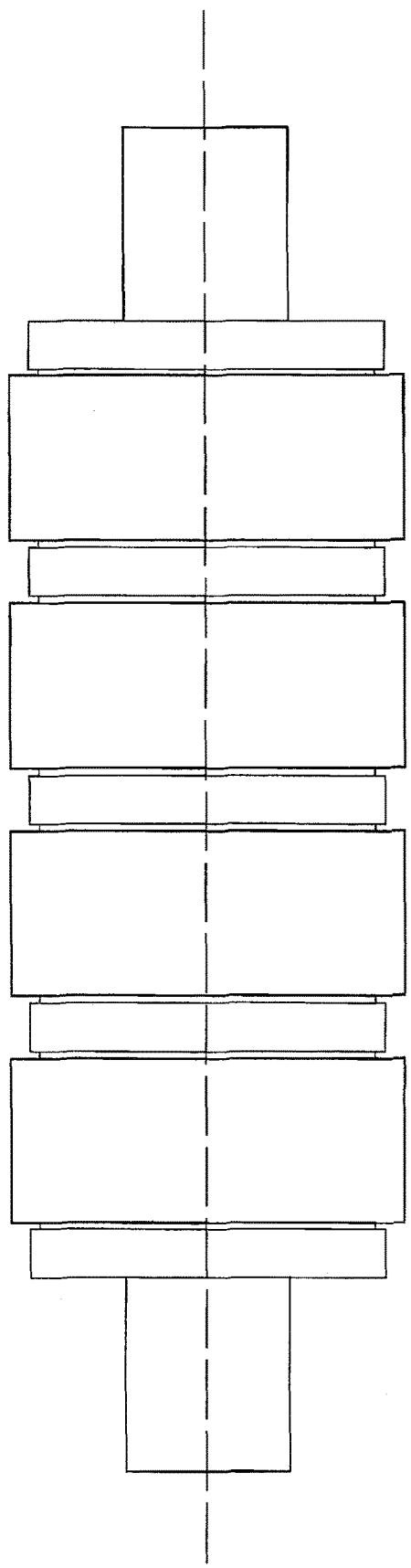
FIG. 6 shows, in schematic form, a design of a back-up roll used in "multi-high" rolling mills.
Figure 7:
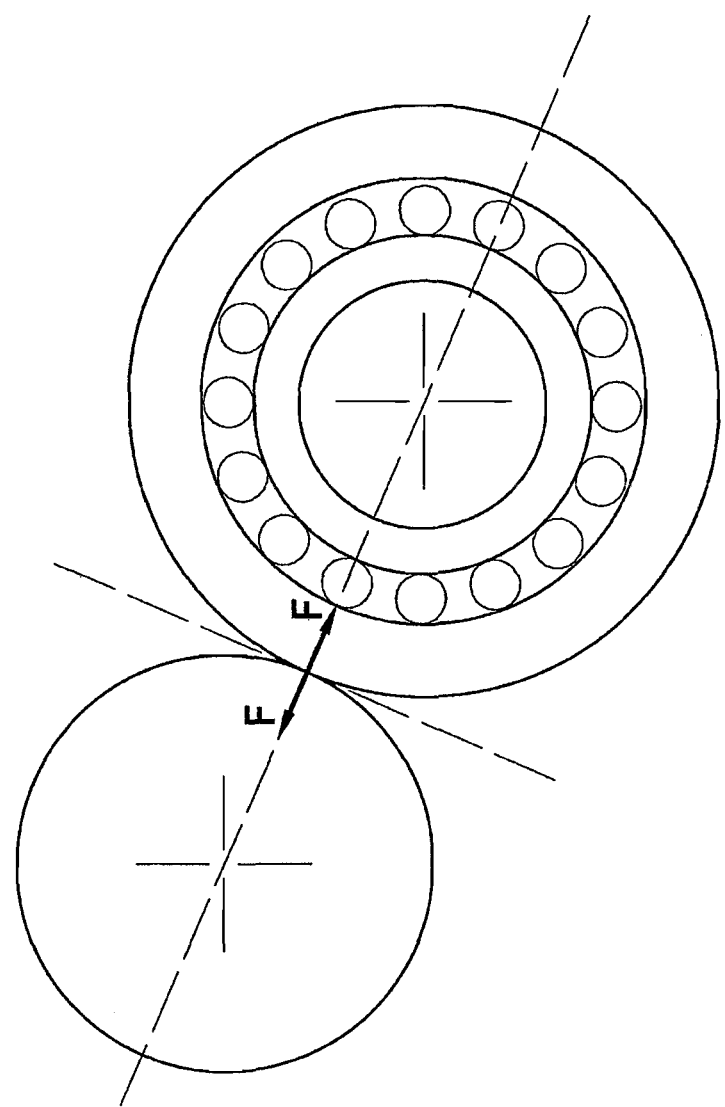
FIG. 7 shows a functioning scheme of a bearing assembled on a "back-up assembly"
Figure 8:
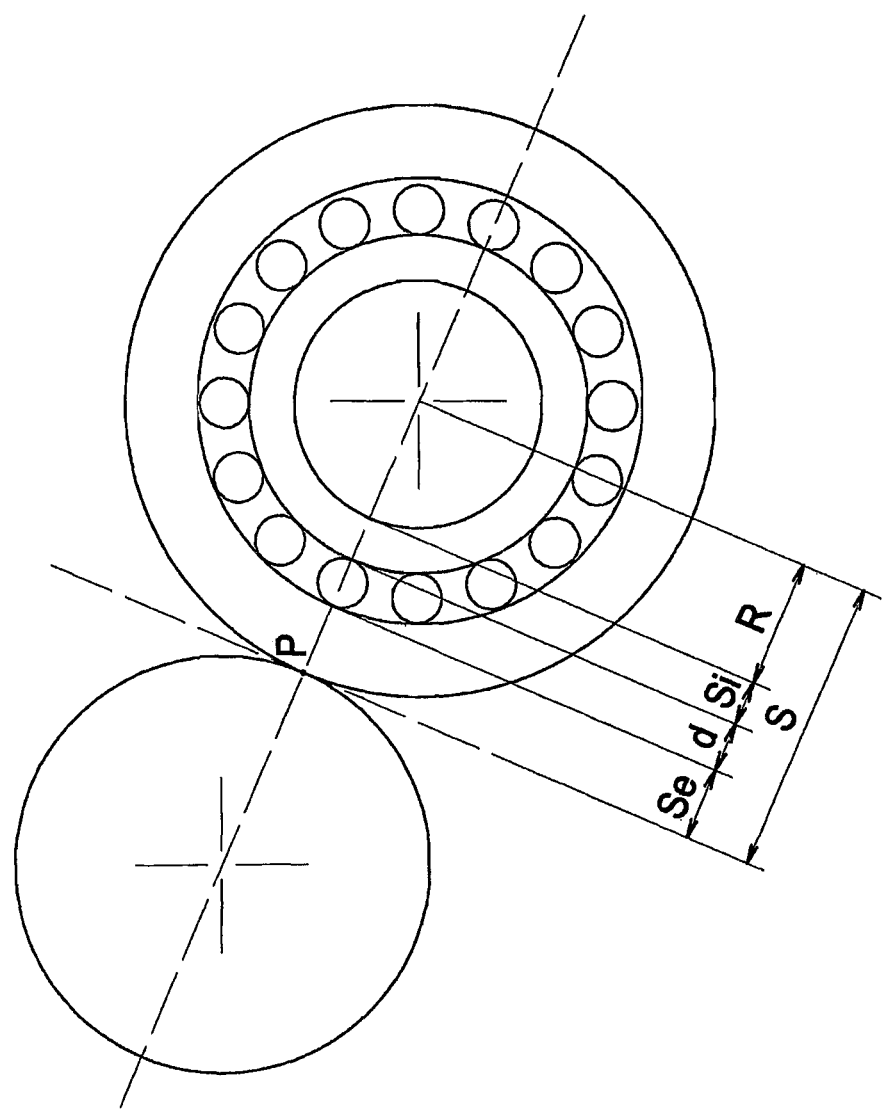
FIG. 8 shows the geometry of a "back-up assembly" as shown in FIG. 7.

Now, by comparing FIG. 21 with FIG. 7 previously illustrated, it can be immediately observed that, with the equipment of the invention, the bearing 11 has been brought to the loading configuration as in the rolling mill during the functioning of the same. It is in fact sufficient to replace the wheel 32 with the second intermediate roll and the lamination force F with the preloading Fr to have a perfect correspondence between the schemes of FIGS. 7 and 21.

At this point, the grinding of the outer surface of the external ring 20, can be effected using an appropriate grinding program. It should be noted that the external ring 20 of the bearing 11 is conveniently rotated using the gear motor 29, 30 which commands the rotation of the contrast roll 25 in contact with the external ring 20 of the bearing 11.

From an analysis of the embodiment of the equipment according to the invention, the description and its functioning for the positioning during grinding of "back-up rings", the following can be observed.

By means of the equipment according to the invention, the bearing, whose outer surface must be subjected to undergo grinding maintenance, is subjected, during said grinding, to a loading scheme almost the same as that to which it is subjected during the processing in the rolling mill. An optimum recovery of the bearing is therefore effected, which does not have any drawback once it has been re-installed on the "back-up assembly".

In this way, neither the productivity, on the one hand, nor the quality, on the other, of the rolling mill, has been affected, which re-assembles the bearings subjected to maintenance treatment by grinding.

In the equipment of the present invention, in fact, it can be seen that the same types of loading and deformation to which the bearing is subjected when it is inserted in the rolling mill, are exactly reproduced.

Other constructional solutions of the equipment are also possible, such as those described hereunder for purely illustrative purposes.

In a variant of the equipment, the pin can be supported on grinding centres (rotating tips in the case of a piece-holder head with a tip and drive disc integral with each other, or a fixed tip in the case of decoupled drive disc and tip)).

A further variant, the rotation control, can be provided by the piece-holder head of the grinding machine, by suitably modifying the flange 15 which is divided into two parts, one exerting the function of axial blockage of the bearing, and the other applied to the side of the assembled bearing, to allow its contact with the drive disc and entrainment of the external ring.

Furthermore, the rotation control can be supplied by a fixed motor at the grinding bench which, by means of a belt, activates a pulley suitably fixed to the side flange 15 as modified above.

It is also shown how the equipment according to the invention can produce specific machines, also according to the invention.

In a first exemplifying embodiment, a machine is proposed for the grinding of "back-up rings" with a movable wheel designed for receiving a piece of equipment with a pin such as that previously illustrated.

FIGS. 22, 23 and 24 show various views of a grinding machine on which equipment of the type previously described and according to the present invention, can be positioned.

In this case, a specific grinding machine of "back-up rings" can be produced, which allows the grinding process of the same to become more rapid and efficient.

A preferred configuration of this machine consists in a base 41 along which a trolley 42 runs in a direction Z. Said trolley 42, in the example, is activated by means of a control actuator 40 composed of an electric motor 43 directly engaged on a worm-screw and slides along suitable guides 44 positioned on the base 41.

A wheelhead 45 slides on said trolley 42, in a direction X perpendicular to the direction Z. The movement of the wheelhead 45 along the direction X can be obtained by means of a suitable control actuator 38 composed of an electric motor 46 directly engaged on a worm-screw 37 and slides along suitable guides 47.

Finally, the wheelhead 45 carries a wheelhead spindle 48 which, without excluding the generic nature of the type of spindle that can be used for the application, is represented by an electro-spindle, i.e. a unit in which the spindle and the motor which activates it are integrated in a single body. This is the rear part of the base.

In the front part of the base 41, there are two openable supports 70, or lunettes, for housing the equipment previously described.

In this case, before beginning the grinding, the bearing must be assembled on the equipment, exactly as described above. When this operation has been completed, the equipment is transported onto the grinding machine and housed on the supports 70. Finally, the preloading positioning of the contrast rolls 25 and 26 is effected on the external ring 20 of the bearing 11 and the grinding of the external ring 20, again as previously indicated.

FIGS. 25, 26 and 27 show various views of a second embodiment of said grinding machine on which equipment of the type previously described and according to the present invention can be positioned.

A preferred configuration of said machine consists of a base 41 and a movable bench on which the equipment of the invention described is positioned; the wheel, on the other hand, is fixed.

This machine is therefore designed for housing the equipment of the invention.

In this case, the two openable supports or lunettes 70 suitable for housing the equipment, instead of being fixed directly on the base 41 of the machine, are constrained to a bench 62, movable in a direction Z1 on the machine by means of a suitable control actuator 63 composed of a motor 64 and a screw 65 and sliding along guides 66.

The equipment according to the invention is therefore used, also in this case.

All the important features forming part of the present invention with respect to both the equipment and grinding machine, can be found in these non-limiting examples.

The objective mentioned in the preamble of the description has therefore been achieved.

The forms of the structure for producing the equipment and machine of the invention, as also the materials and assembly and functioning modes, can obviously differ from those shown for purely illustrative and non-limiting purposes in the drawings.

The protection scope of the present invention is therefore defined by the enclosed claims.

The invention claimed is:

1. Equipment for grinding external rings of roller bearings, in particular for rolling mills, comprising:
   a supporting pin (12) of a completely assembled bearing (11) to be subjected to grinding;
   a stop (13) which extends outwardly from an axis of the supporting pin (12) for axial positioning of a first side of the bearing (11);
   a sliding flange (15) disposed on the pin (12), which is movable to be positioned to rest on a second side of the bearing (11) inserted on the pin;
   a clamping nut (16) which is movable to be firmly positioned on a complementary portion of the pin (12);
   skids (17 and 18) preloaded by springs (21,82) situated on opposite sides of the bearing (11), all of which guarantees axial stability of both an internal ring (14), of rolling elements (19), and of an external ring (20) of the bearing (11), allowing the external ring (20) to rotate on the rolling elements (19); and
   a guiding element (23) on opposite side of said stop (13) on the pin (12), the guiding element receiving a structure (24) carrying a pair of contrast rolls (25, 26) movable to be engaged with the external ring (20) of the bearing (11) creating a radial force thereon, which can be predetermined and regulated by a maneuvering element (27) to eliminate a clearance of the bearing in a radial direction.

2. The equipment according to claim 1, further comprising gaskets (84,22), situated on opposite sides of the bearing (11) in a position interposed between components (14,19,20) of the bearing (11) and said flanges (13,15) to prevent entry of external fluids during the grinding.

3. The equipment according to claim 1, wherein said stop (13) is annular and extends radially from a side surface of the pin in form of a flanging.

4. The equipment according to claim 1, wherein said maneuvering element comprises a maneuvering screw (27) inserted in said structure (24) carrying the pair of contrast rolls (25,26), the maneuvering screw moving said structure (24) with respect to said pin (12) along a desired grinding direction X.

5. The equipment according to claim 4, wherein a nut (83) floating in a radial direction with respect to the structure (24) and a spring (28), which modulates a preloading of the nut, are associated with said maneuvering screw (27).

6. The equipment according to claim 1, wherein at least one (25) of said contrast rolls (25,26) is rotated by a gear motor (29,30) connected thereto.

7. The equipment according to claim 1, wherein at least one (26) of said contrast rolls (25,26) is idle.

8. A machine for grinding of external rings of roller bearings, in particular for rolling mills, comprising:
    a base (41) on which a grinding group rests, comprising a wheelhead (45) and a grinding spindle (48) for a grinder (32) on one side facing a pair of supports, or lunettes (70), which house equipment comprising:
    a supporting pin (12) of a completely assembled bearing (11) to be subjected to grinding;
    a stop (13) which extends outwardly from an axis of the supporting pin (12) for axial positioning of a first side of the bearing (11);
    a sliding flange (15) disposed on the pin (12), which is movable to be positioned to rest on a second side of the bearing (11) inserted on the pin;
    a clamping nut (16) which is movable to be firmly positioned on a complementary portion of the pin (12);
    skids (17 and 18) preloaded by springs (21,82) situated on opposite sides of the bearing (11), all of which guarantees axial stability of both an internal ring (14), of rolling elements (19), and of an external ring (20) of the bearing (11), allowing the external ring (20) to rotate on the rolling elements (19); and
    a guiding element (23) on opposite side of said stop (13) on the pin (12), the guiding element receiving a structure (24) carrying a pair of contrast rolls (25, 26) movable to be engaged with the external ring (20) of the bearing (11) creating a radial force thereon, which can be predetermined and regulated by a maneuvering element (27) to eliminate a clearance of the bearing in a radial direction.

9. The machine according to claim 8, wherein said equipment is fixed with respect to said base (41) and said grinding group is movable.

10. The machine according to claim 8, wherein said supports (70), which house said equipment are constrained to a movable bench (75) with respect to said base and said grinding group is fixed with respect to said base.

* * * * *

UNITED STATES PATENT AND TRADEMARK OFFICE
CERTIFICATE OF CORRECTION

PATENT NO. : 10,040,159 B2  
APPLICATION NO. : 15/118084  
DATED : August 7, 2018  
INVENTOR(S) : Giovanni Boselli et al.

Page 1 of 1

It is certified that error appears in the above-identified patent and that said Letters Patent is hereby corrected as shown below:

On the Title Page

Inventors Item (72): Replace --Andresson-- with --Andersson--.

Signed and Sealed this
Sixteenth Day of October, 2018

Andrei Iancu
*Director of the United States Patent and Trademark Office*